(12) United States Patent
Kruckenberg et al.

(10) Patent No.: US 11,247,156 B2
(45) Date of Patent: *Feb. 15, 2022

(54) WATER FILTER SYSTEM

(71) Applicant: WHIRLPOOL CORPORATION, Benton Harbor, MI (US)

(72) Inventors: Christopher A. Kruckenberg, Newburgh, IN (US); John W. Morrison, Oxford, MI (US); Jeffrey A. Spindler, Haubstadt, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/843,936

(22) Filed: Apr. 9, 2020

(65) Prior Publication Data

US 2020/0230534 A1     Jul. 23, 2020

Related U.S. Application Data

(60) Continuation of application No. 16/009,364, filed on Jun. 15, 2018, now Pat. No. 10,653,985, which is a continuation of application No. 14/483,593, filed on Sep. 11, 2014, now Pat. No. 10,022,658, which is a division of application No. 13/233,309, filed on Sep. 15, 2011, now Pat. No. 8,845,896.

(51) Int. Cl.
    *B01D 35/30*     (2006.01)
    *C02F 1/00*     (2006.01)

(52) U.S. Cl.
    CPC ........... *B01D 35/306* (2013.01); *B01D 35/30* (2013.01); *C02F 1/003* (2013.01); *B01D 2201/296* (2013.01); *B01D 2201/302* (2013.01); *B01D 2201/4007* (2013.01); *B01D 2201/4015* (2013.01); *B01D 2201/4046* (2013.01); *C02F 2201/004* (2013.01); *C02F 2201/006* (2013.01); *C02F 2209/445* (2013.01); *C02F 2307/10* (2013.01); *C02F 2307/12* (2013.01)

(58) Field of Classification Search
    CPC .............................................. B01D 2201/4007
    See application file for complete search history.

(56) References Cited

U.S. PATENT DOCUMENTS 2,955,712 A     10/1960     Janusz
3,388,801 A     6/1968     Boyd et al.
(Continued)

FOREIGN PATENT DOCUMENTS

CN     2889448 Y     4/2007
DE     102006034943 A1     1/2008
(Continued)

*Primary Examiner* — Benjamin M Kurtz
(74) *Attorney, Agent, or Firm* — Price Heneveld LLP

(57) ABSTRACT

A water filter system includes a removable filter unit having a body portion including a proximal end and a distal end. The proximal end is adapted to be inserted into a filter head assembly. A laterally extending key member is disposed on the body portion and adapted to engage a key slot in the filter head assembly. An engagement protrusion extends from the proximal end. The engagement protrusion includes a first portion that has a first radius of curvature and a second portion opposing the first portion that includes a second radius of curvature that is larger than the first radius of curvature.

10 Claims, 27 Drawing Sheets

(56) References Cited

U.S. PATENT DOCUMENTS

| | | |
|---|---|---|
| 3,557,958 A | 1/1971 | Baldwin |
| 3,774,764 A | 11/1973 | Baldwin |
| 3,855,128 A | 12/1974 | Shaltz et al. |
| 3,980,457 A | 9/1976 | Smith |
| 4,052,307 A | 10/1977 | Humbert, Jr. |
| 4,299,699 A | 11/1981 | Boogay |
| 4,398,562 A | 8/1983 | Saarem et al. |
| 4,601,821 A | 7/1986 | Sherman et al. |
| 4,608,166 A | 8/1986 | Cain |
| 4,615,812 A | 10/1986 | Darling |
| 4,735,716 A | 4/1988 | Petrucci et al. |
| 4,764,275 A | 8/1988 | Robichaud |
| 4,915,831 A | 4/1990 | Taylor |
| 4,935,135 A | 6/1990 | Nakashima et al. |
| 4,956,086 A | 9/1990 | Thomsen et al. |
| 5,019,251 A | 5/1991 | Sundholm |
| D322,836 S | 12/1991 | Petrucci et al. |
| 5,114,572 A | 5/1992 | Hunter et al. |
| 5,133,382 A | 7/1992 | Nielsen |
| 5,139,050 A | 8/1992 | Otto |
| 5,273,255 A | 12/1993 | Klicek et al. |
| 5,350,506 A | 9/1994 | Dombek et al. |
| 5,362,390 A | 11/1994 | Widenhoefer et al. |
| D356,625 S | 3/1995 | Petrucci et al. |
| 5,456,830 A | 10/1995 | Stanford et al. |
| 5,560,824 A | 10/1996 | Sann et al. |
| 5,567,310 A | 10/1996 | Nakashima |
| 5,567,311 A | 10/1996 | Jang |
| 5,591,332 A | 1/1997 | Reid et al. |
| 5,607,582 A | 3/1997 | Yamazaki et al. |
| 5,611,923 A | 3/1997 | Suri et al. |
| 5,653,871 A | 8/1997 | Thomsen |
| 5,698,093 A | 12/1997 | Pyle et al. |
| 5,800,702 A | 9/1998 | Taylor-McCune et al. |
| 5,826,854 A | 10/1998 | Janvrin et al. |
| 5,846,417 A | 12/1998 | Jiang et al. |
| 5,858,227 A | 1/1999 | Stone et al. |
| 5,914,037 A | 6/1999 | Yen et al. |
| 6,000,674 A | 12/1999 | Chen |
| 6,024,869 A | 2/2000 | Stifelman |
| 6,027,644 A | 2/2000 | Magnusson et al. |
| 6,068,770 A | 5/2000 | Niermeyer et al. |
| 6,132,176 A | 10/2000 | Higgins |
| D435,631 S | 12/2000 | Janik et al. |
| RE37,216 E | 6/2001 | Koslow |
| 6,241,132 B1 | 6/2001 | Morrison |
| 6,303,031 B1 | 10/2001 | Senner |
| 6,337,015 B1 | 1/2002 | Poirier |
| 6,360,764 B1 | 3/2002 | Fritze |
| 6,423,222 B1 | 7/2002 | Shively et al. |
| 6,458,269 B1 | 10/2002 | Bassett et al. |
| D472,299 S | 3/2003 | Fritze |
| D472,604 S | 4/2003 | Fritze |
| 6,579,455 B1 | 6/2003 | Muzik et al. |
| 6,632,355 B2 | 10/2003 | Fritze |
| D484,568 S | 12/2003 | Janik et al. |
| 6,789,691 B2 | 9/2004 | Martin et al. |
| 6,936,084 B2 | 8/2005 | Schlensker et al. |
| 6,977,039 B2 | 12/2005 | Knoll et al. |
| 7,000,894 B2 | 2/2006 | Olson et al. |
| 7,067,054 B2 | 6/2006 | Fritze |
| 7,147,772 B2 | 12/2006 | Fritze |
| 7,147,773 B2 | 12/2006 | Mitchell et al. |
| 7,326,342 B2 | 2/2008 | Richmond et al. |
| D567,898 S | 4/2008 | Miller |
| 7,407,148 B2 | 8/2008 | Bassett et al. |
| 7,442,301 B2 | 10/2008 | Huda |
| 7,459,078 B2 | 12/2008 | Klein et al. |
| 7,481,926 B2 | 1/2009 | Dworatzek |
| 7,481,928 B2 | 1/2009 | Fritze |
| D599,880 S | 9/2009 | Rampen et al. |
| 7,610,932 B2 | 11/2009 | Olson et al. |
| 7,638,042 B2 | 12/2009 | Astle et al. |
| 7,695,619 B2 | 4/2010 | Kurth et al. |
| 7,744,758 B2 | 6/2010 | Dworatzek et al. |
| 7,763,170 B2 | 7/2010 | Bassett et al. |
| 7,799,220 B2 | 9/2010 | Fritze |
| 7,900,769 B1 | 3/2011 | Chen |
| 7,909,999 B2 | 3/2011 | Noh et al. |
| 7,955,500 B2 | 6/2011 | Abdalla et al. |
| 7,959,010 B2 | 6/2011 | Hawkins et al. |
| 8,032,422 B2 | 10/2011 | Pickard et al. |
| 8,070,945 B2 | 12/2011 | Stankowski et al. |
| 8,097,061 B2 | 1/2012 | Smith et al. |
| 8,097,156 B2 | 1/2012 | Tubby et al. |
| 8,097,158 B2 | 1/2012 | Tubby et al. |
| 8,118,997 B2 | 2/2012 | Ebrom et al. |
| 8,236,176 B2 | 8/2012 | Fall et al. |
| 8,245,851 B2 | 8/2012 | Hawkins et al. |
| 8,268,170 B2 | 9/2012 | Core et al. |
| 8,333,818 B2 | 12/2012 | Foerster et al. |
| 8,354,024 B2 | 1/2013 | Ihle et al. |
| 8,356,716 B1* | 1/2013 | Kruckenberg ......... B01D 35/30 210/435 |
| 8,366,930 B2 | 2/2013 | Huda et al. |
| 8,393,167 B2 | 3/2013 | Krause et al. |
| 8,398,853 B2 | 3/2013 | An et al. |
| 8,413,818 B1* | 4/2013 | Kruckenberg ......... C02F 1/001 210/435 |
| 8,442,042 B2 | 5/2013 | McCoy |
| 8,454,826 B2 | 6/2013 | Donnelly et al. |
| 8,562,830 B2 | 10/2013 | Reid |
| 8,580,109 B2 | 11/2013 | Kruckenberg et al. |
| 8,591,736 B2 | 11/2013 | Kruckenberg et al. |
| 8,627,675 B2 | 1/2014 | Kruckenberg et al. |
| 8,709,246 B2 | 4/2014 | Branscomb |
| 8,887,324 B2 | 11/2014 | Klicpera |
| 8,911,623 B2 | 12/2014 | Tubby et al. |
| 8,950,052 B2 | 2/2015 | Kruckenberg et al. |
| 9,044,695 B2 | 6/2015 | Sann et al. |
| 9,157,677 B2 | 10/2015 | Mitchell |
| 9,211,488 B2 | 12/2015 | South et al. |
| 9,345,995 B2 | 5/2016 | Tubby et al. |
| 9,494,362 B2 | 11/2016 | Lim et al. |
| 9,533,243 B2 | 1/2017 | Kruckenberg et al. |
| 9,687,762 B2 | 6/2017 | Tubby et al. |
| 9,931,589 B2 | 4/2018 | Tubby et al. |
| 10,010,820 B1* | 7/2018 | Kruckenberg ......... C02F 1/003 |
| 10,653,985 B2* | 5/2020 | Kruckenberg ......... C02F 1/003 |
| 2002/0166805 A1 | 11/2002 | Minns et al. |
| 2004/0211931 A1 | 10/2004 | Olson et al. |
| 2005/0252841 A1 | 11/2005 | Bassett et al. |
| 2006/0060512 A1 | 3/2006 | Astle et al. |
| 2006/0070942 A1 | 4/2006 | An |
| 2006/0169629 A1 | 8/2006 | Donnelly et al. |
| 2006/0191827 A1 | 8/2006 | Fritze |
| 2006/0272995 A1 | 12/2006 | Fritze |
| 2007/0012611 A1 | 1/2007 | An |
| 2007/0199876 A1 | 8/2007 | Tubby |
| 2007/0227959 A1 | 10/2007 | Sinur et al. |
| 2007/0239461 A1 | 10/2007 | Poninski et al. |
| 2007/0295667 A1 | 12/2007 | Ruprecht |
| 2008/0000820 A1 | 1/2008 | Mitchell |
| 2008/0060982 A1 | 3/2008 | Krause et al. |
| 2008/0078710 A1 | 4/2008 | Larkner |
| 2008/0078723 A1 | 4/2008 | Larkner |
| 2008/0123297 A1 | 5/2008 | Tilton et al. |
| 2008/0185330 A1 | 8/2008 | Sinur et al. |
| 2008/0223775 A1 | 9/2008 | An |
| 2009/0045926 A1 | 2/2009 | Ebrom et al. |
| 2009/0293528 A1 | 12/2009 | Buchstab et al. |
| 2009/0321340 A1 | 12/2009 | Rampen et al. |
| 2010/0018238 A1 | 1/2010 | Gerner et al. |
| 2010/0102082 A1 | 4/2010 | Ebrom et al. |
| 2010/0131082 A1 | 5/2010 | Chandler |
| 2010/0264078 A1 | 10/2010 | Bassett et al. |
| 2011/0147297 A1 | 6/2011 | Core et al. |
| 2011/0174705 A1 | 7/2011 | Branscomb |
| 2012/0000858 A1 | 1/2012 | Butler et al. |
| 2012/0145621 A1 | 6/2012 | Tubby et al. |
| 2013/0068682 A1 | 3/2013 | Kruckenberg et al. |
| 2013/0068683 A1 | 3/2013 | Kruckenberg et al. |
| 2013/0068684 A1 | 3/2013 | Kruckenberg et al. |
| 2014/0138292 A1 | 5/2014 | Kruckenberg et al. |

(56) References Cited

U.S. PATENT DOCUMENTS

| 2014/0144819 | A1 | 5/2014 | Verdegan et al. |
| 2017/0056794 | A1 | 3/2017 | Chernov et al. |
| 2017/0259195 | A1 | 9/2017 | Mitchell |

FOREIGN PATENT DOCUMENTS

| GB | 2346568 | A | 8/2000 |
| WO | 0134272 | A1 | 5/2001 |
| WO | 2010056711 | A2 | 5/2010 |
| WO | 2010070102 | A1 | 6/2010 |
| WO | 2011047754 | A1 | 4/2011 |

* cited by examiner

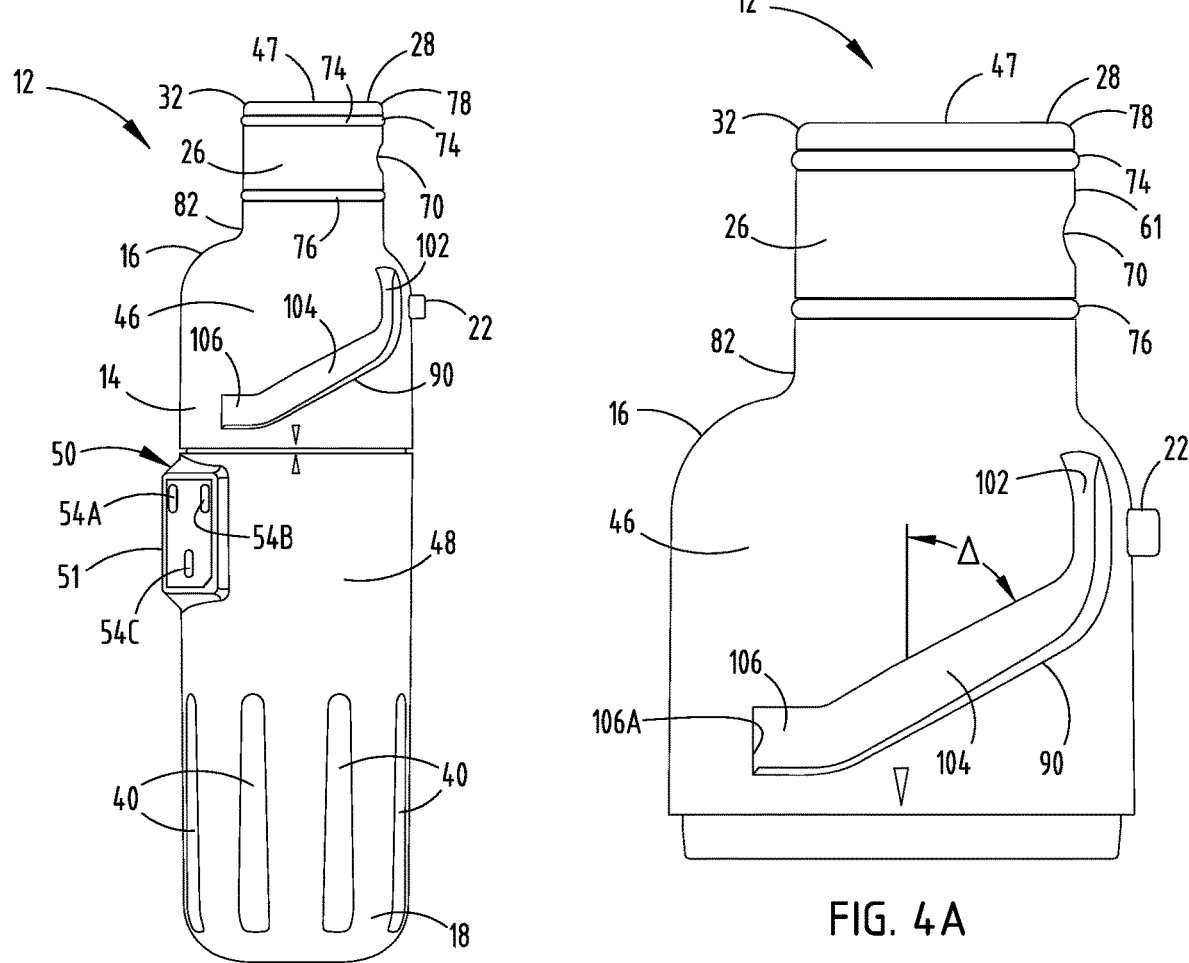
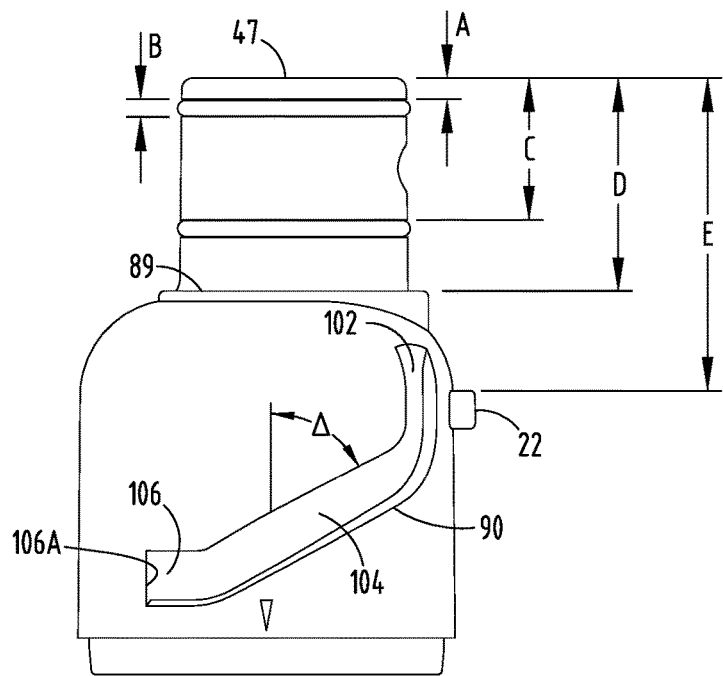
FIG. 4
FIG. 4A
FIG. 4B

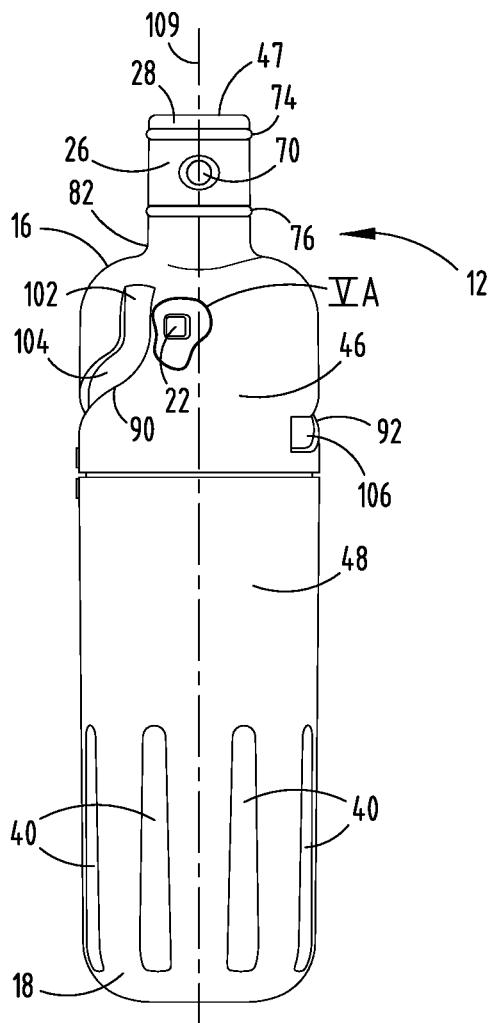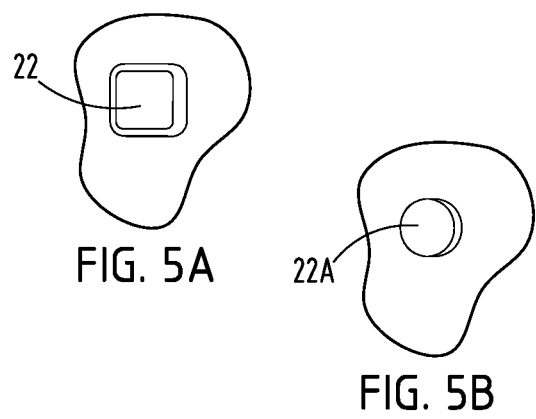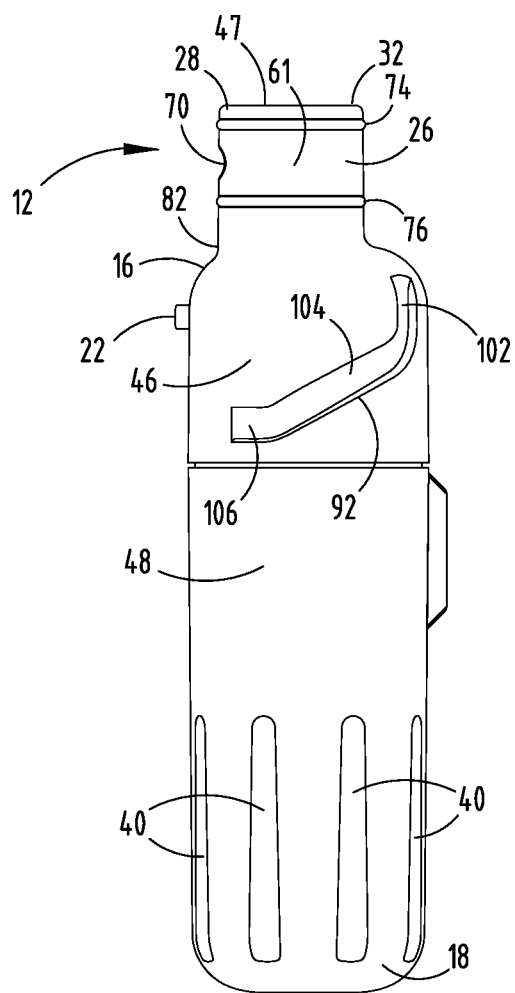
FIG. 5
FIG. 5A
FIG. 5B
FIG. 6

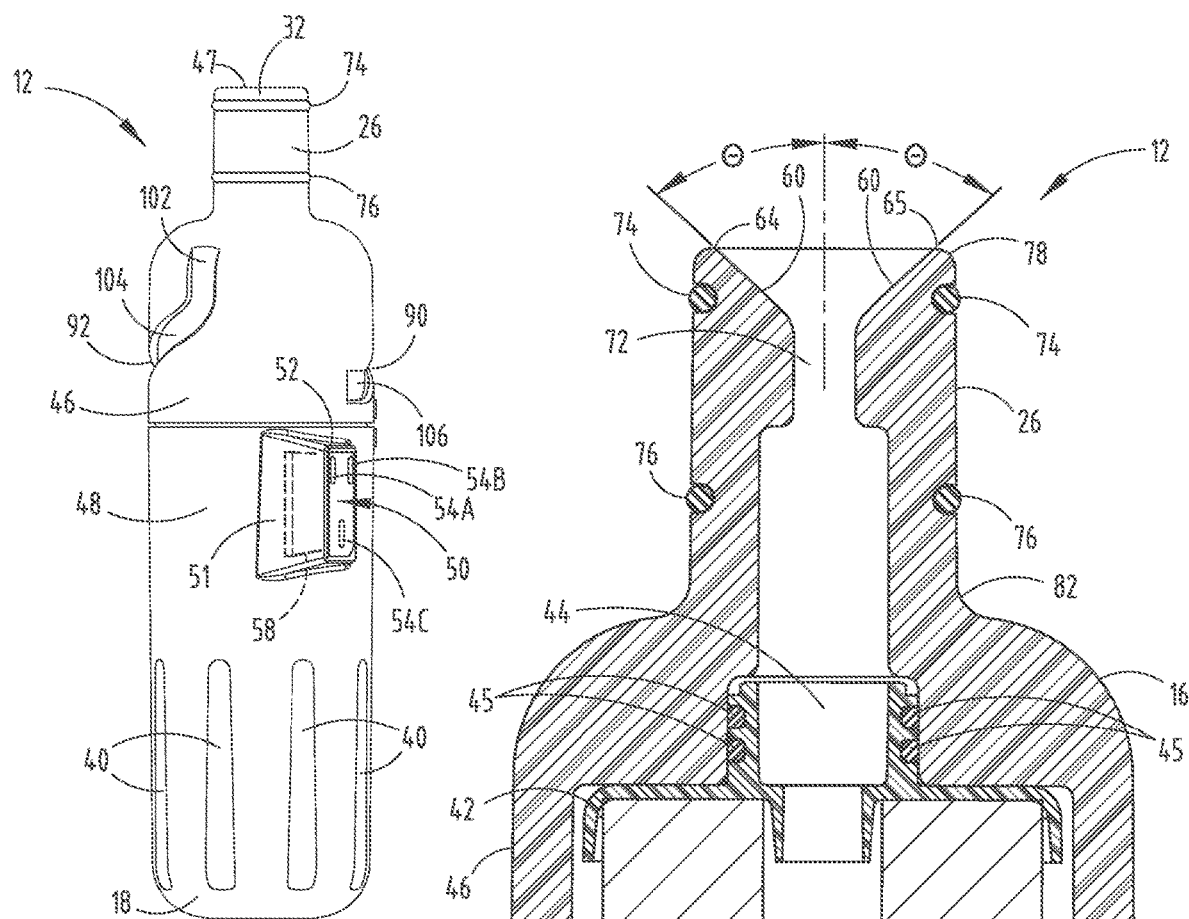
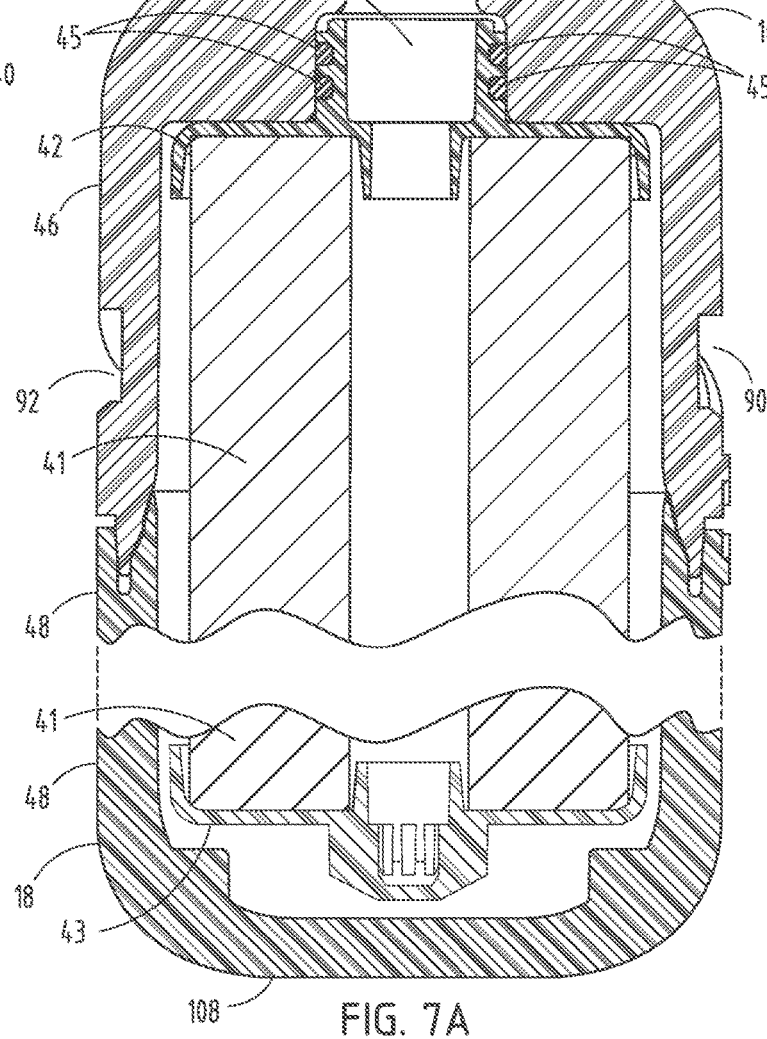
FIG. 7
FIG. 7A

WATER FILTER SYSTEM

CROSS-REFERENCE TO RELATED APPLICATION

This application is a continuation of U.S. patent application Ser. No. 16/009,364, filed on Jun. 15, 2018, entitled WATER FILTER SYSTEM, now U.S. Pat. No. 10,653,985, which is a continuation of application Ser. No. 14/483,593, filed Sep. 11, 2014, entitled WATER FILTER SYSTEM, now U.S. Pat. No. 10,022,658, which is a division of U.S. patent application Ser. No. 13/233,309, filed on Sep. 15, 2011, entitled WATER FILTER SYSTEM, now U.S. Pat. No. 8,845,896, the entire disclosures of which are hereby incorporated herein by reference.

BACKGROUND OF THE PRESENT INVENTION

The present invention generally relates to a water filter system, and more specifically, to a water filter system that includes a filter unit that includes keyed features for interfacing with engagement features on a filter head assembly.

SUMMARY OF THE INVENTION

In one aspect of the present invention, a water filter system includes a removable filter unit having a body portion including a proximal end and a distal end. The proximal end is adapted to be inserted into a filter head assembly. A laterally extending key member is disposed on the body portion and adapted to engage a key slot in the filter head assembly. An engagement protrusion extends from the proximal end. The engagement protrusion includes a first portion that has a first radius of curvature and a second portion opposing the first portion that includes a second radius of curvature that is larger than the first radius of curvature.

In another aspect of the present invention, a water filter system includes a filter unit having a body portion adapted to be rotatingly received into a filter head assembly having an interference member. An engagement protrusion extends from the body portion and is adapted for reception in a complementary receiver in the filter head assembly. A first engagement surface traverses at least part of the body portion. A second engagement surface traverses at least part of the body portion. A laterally extending key member is disposed on the body portion between the first engagement surface and the second engagement surface. The laterally extending key member is adapted to reposition the interference member from an interference position, whereby the body portion cannot be fully inserted into the filter head assembly, to a non-interference position, whereby the body portion can be fully inserted into the head assembly.

In yet another aspect of the present invention, a water filter system includes a filter unit with a body portion adapted for engagement with a filter head assembly. An engagement protrusion extends from the body portion. The engagement protrusion has a cross-section with only one axis of symmetry. A side aperture is disposed on the engagement protrusion. An end aperture is disposed on the engagement protrusion.

These and other features, advantages, and objects of the present invention will be further understood and appreciated by those skilled in the art upon studying the following specification, claims, and appended drawings.

BRIEF DESCRIPTION OF THE DRAWINGS

FIG. 4 is an elevational view of a first side of the water filter of FIG. 3;

FIG. 4A is an enlarged elevational view of a first side of a forward casing of the water filter of FIG. 3;

FIG. 4B is an enlarged elevational view of a first side of a forward casing of the water filter of FIG. 3;

FIG. 5 is a front elevational view of the water filter of FIG. 3 with casings;

FIG. 5A is an enlarged view of one embodiment of a laterally extending key member;

FIG. 5B is an enlarged view of another embodiment of a laterally extending key member;

FIG. 6 is an elevational view of a second side of the water filter of FIG. 3;

FIG. 7 is a rear elevational view of the water filter of FIG. 3;

FIG. 7A is an enlarged cross-sectional view of the water filter of FIG. 3 taken at VIIA-VIIA;

DETAILED DESCRIPTION OF EMBODIMENTS

Figure 1:
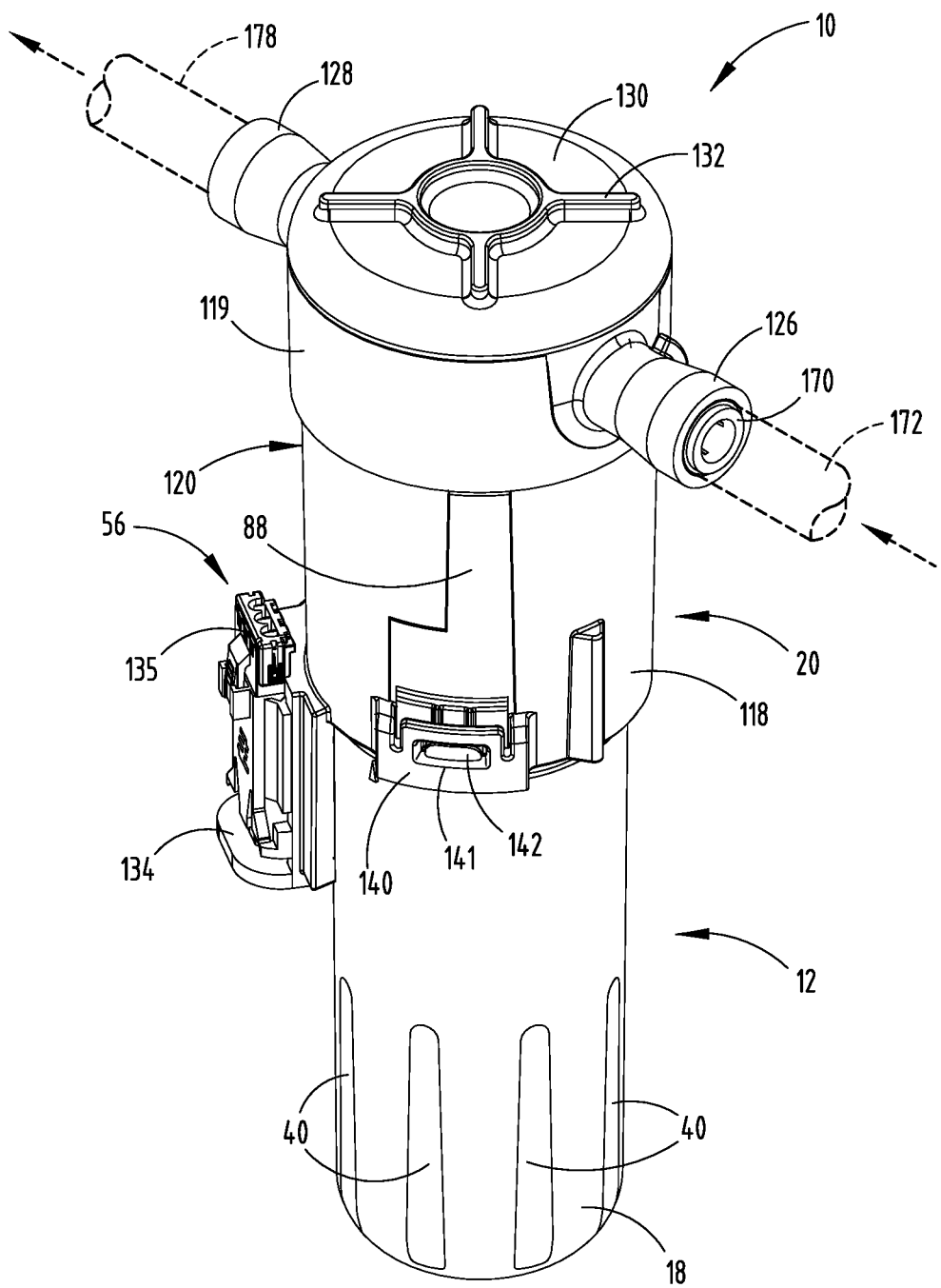
FIG. 1 is a top perspective view of one embodiment of a water filter system of the present invention.
Figure 3:
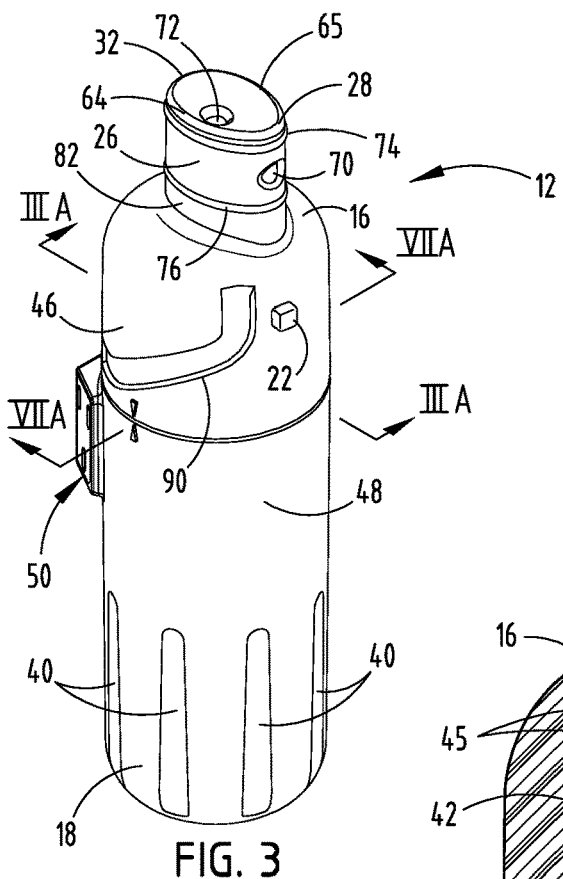
FIG. 3 is a top perspective view of one embodiment of a water filter of the present invention.

For purposes of description herein the terms "upper," "lower," "right," "left," "rear," "front," "vertical," "horizontal," and derivatives thereof shall relate to the invention as oriented in FIGS. 1 and 3. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
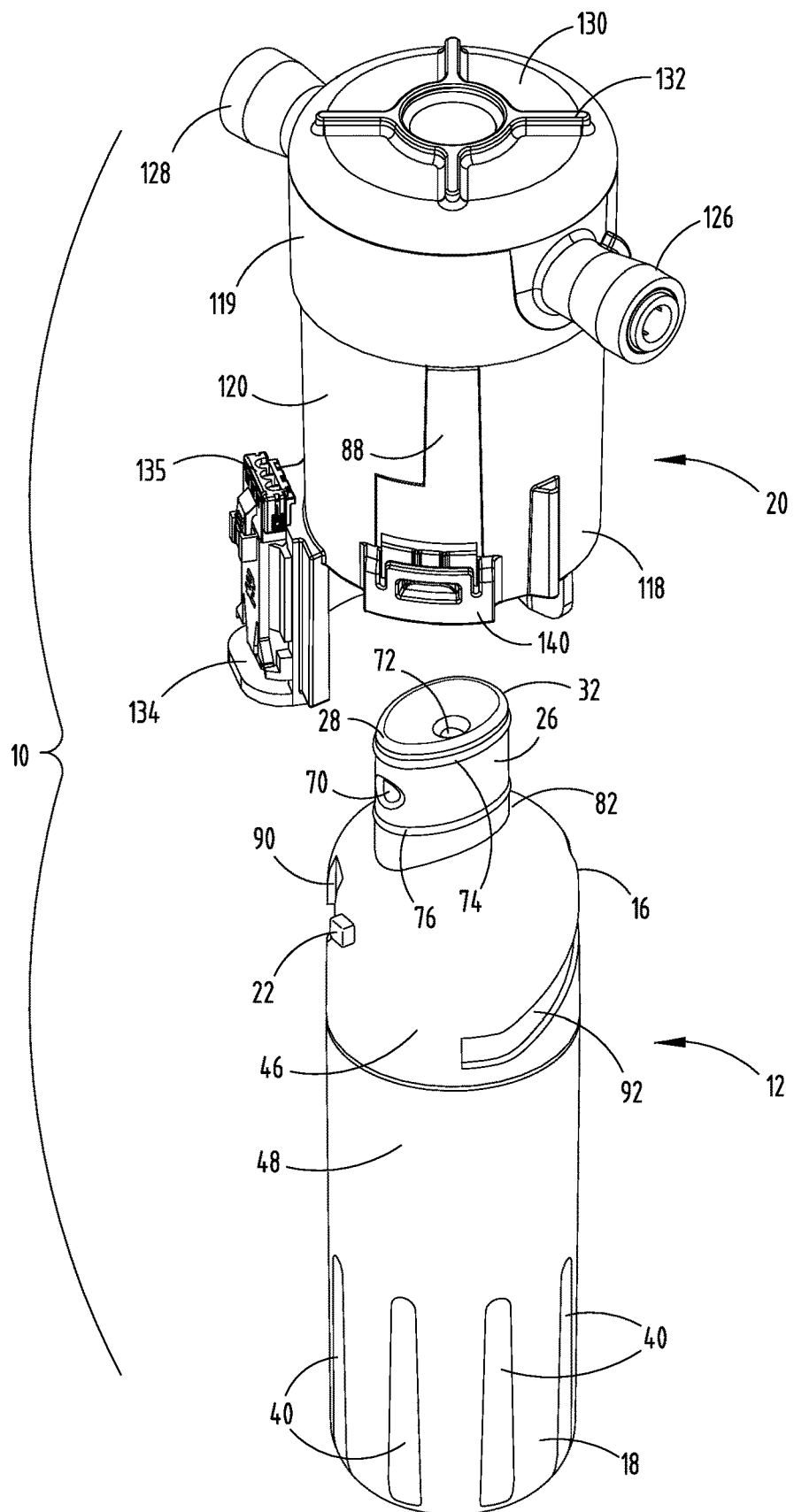
FIG. 2 is a front perspective view of the water filter system of FIG. 1 with the water filter withdrawn from the filter head assembly.
Figure 11:
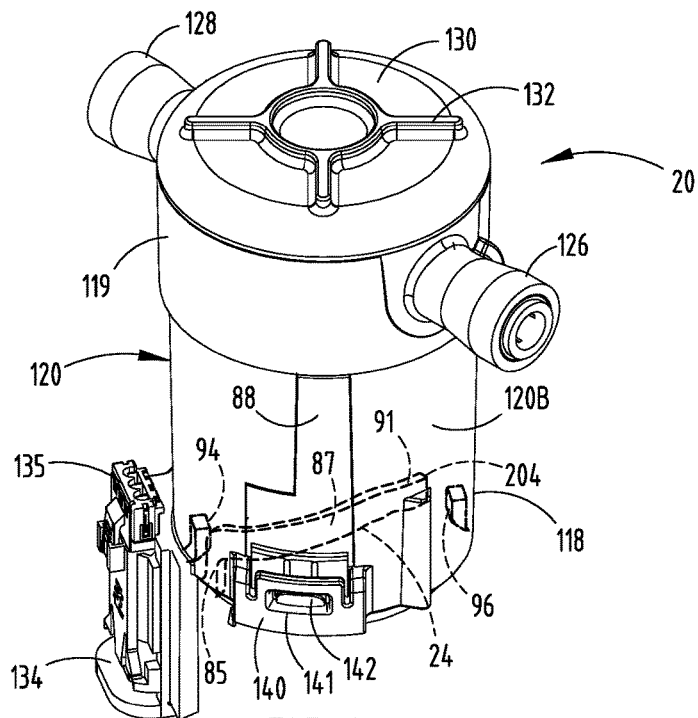
FIG. 11 is a top perspective view of one embodiment of a filter head assembly of the present invention.
Figure 12:
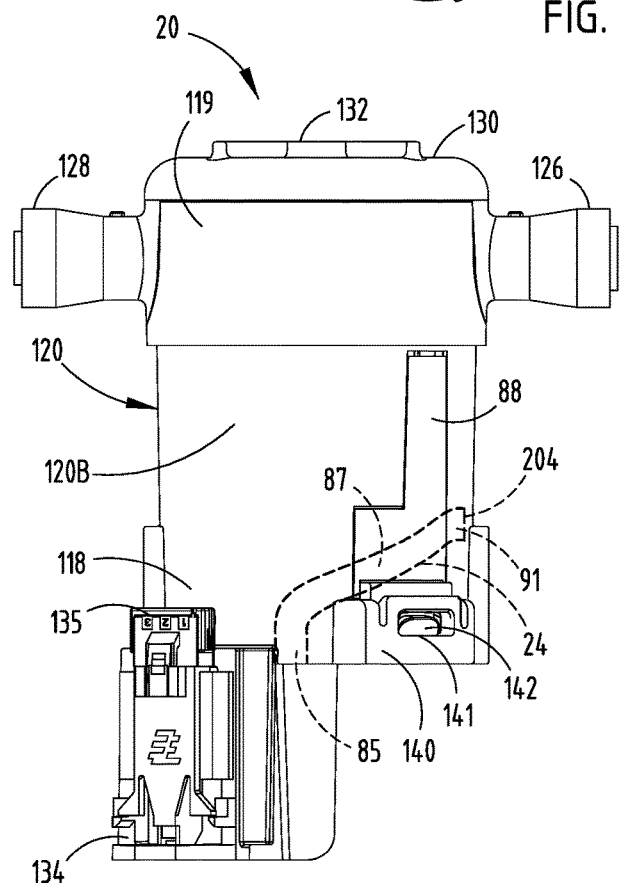
FIG. 12 is a front elevational view of the filter head assembly of FIG. 11.

Referring to the embodiment illustrated in FIGS. 1 and 2, reference numeral 10 generally designates a water filter system including a filter unit 12 having a body portion 14 (FIG. 4) having a proximal end 16 and a distal end 18. The proximal end 16 is adapted to be inserted into a filter head assembly 20. A laterally extending key member 22 is disposed on the body portion 14 and adapted to engage a key slot 24 (FIG. 11) in the filter head assembly 20. An engagement protrusion 26 extends from the proximal end 16. The engagement protrusion 26 includes a first portion 28 having a first radius of curvature and a second portion 32 opposing the first portion 28 that includes a second radius of curvature that is larger than the first radius of curvature.

Referring now to FIGS. 3-4B, the body portion 14 of the filter unit 12 includes a cylinder-like construction having a diameter that is easily graspable by the hand of a user. A multitude of grasping cutouts 40 are disposed on the body portion 14 and extend toward the distal end 18 of the body portion 14 and are designed to provide a gripping surface for a user to both engage and disengage the filter unit 12 from the filter head assembly 20. As disclosed in further detail herein, engagement of the filter unit 12 typically includes rotational and longitudinal movement of the filter unit 12 relative to the filter head assembly 20. An internal portion of the filter unit 12 includes a water filter 39 having a filtering media 41 designed to filter and clean water that passes through the filter unit 12 during use. The filtering media 41 includes end caps 42, 43 that secure the filtering media 41 in place in the body portion 14 of the filter unit 12. The end cap 42 includes an outlet 44 that relays filtered water out of the filtering media 41 after the water has been filtered. Seals 45 prevent cross-contamination of unfiltered water with filtered water that has passed through the filtering media 41. As shown in FIG. 4B, the distance A from a distal protrusion surface 47 of the filter unit 12 to a first seal 74 is approximately 2.69 millimeters. The first seal 74 and a second seal 76 have a thickness B of approximately 2.62 millimeters. The distance C between the distal protrusion surface 47 and the second seal 76 is approximately 18.69 millimeters, while the distance D from the distal protrusion surface 47 to a shoulder support 89 is approximately 28.30 millimeters. Finally, the distance E from the distal protrusion surface 47 to the laterally extending key member 22 is approximately 41.20 millimeters. The dimensions noted above are specifically configured to complement and interact with the filter head assembly 20, thereby allowing for tight and secure engagement of the filter unit 12 with the filter head assembly 20.

As readily observed in FIG. 5, the engagement protrusion 26 is centrally aligned as viewed from the front. However, as illustrated in FIG. 6, the engagement protrusion 26 is offset as viewed from the side. Thus, the engagement protrusion 26 is generally disposed in an offset position on the proximal end of the filter unit 12. Further, as evidenced in FIG. 5, the outlet 72 is generally aligned with a central longitudinal axis 109 that extends longitudinally through the center of the filter unit 12. The laterally extending key member 22 can be constructed in a variety of shapes. For example, the laterally extending key member can include a rectangular shape (FIG. 5A), a cylindrical shape (FIG. 5B), or any other shape adapted to interface with the key slot 24 of the filter head assembly 20. Regardless of the shape, the laterally extending key member 22 generally has a width of approximately 2.75 millimeters, a height of approximately 2.75 millimeters, and extends approximately 27.73 millimeters from the central longitudinal axis 109.

The body portion 14 of the filter unit 12 is defined by a forward casing 46 and a rearward casing 48 that are placed in abutting engagement over the water filter 39 disposed inside the filter unit 12. The forward casing 46 may be attached to the rearward casing 48 in any known manner, such as by heat staking, welding, or mechanical fastener attachment. Alternatively, it is contemplated that the body portion 14 could include one integral casing formed from a single part. The engagement protrusion 26 extends from the proximal end 16 of the filter unit 12 and is smaller in cross-sectional area than the body portion 14 of the filter unit 12. The body portion 14 tapers gradually from the proximal end 16 to the distal end 18.

The illustrated embodiment of FIGS. 3-7 depict an electronic device 50 that is disposed on and extends from an outer circumference of the body portion 14 between the proximal end 16 and the distal end 18 of the filter unit 12. In the illustrated embodiments, the electronic device 50 includes a protective cover 51 having a triangular-type cross-section with an apex 52 of the triangular-type cross-section extending away from the body portion 14 of the filter unit 12. The electronic device 50 includes a power contact 54A, a data contact 54B, and a ground contact 54C. The data contact 54B relays information pertaining to the filter unit 12 capacity, filter unit 12 usage data, and the number of days until a replacement filter unit 12 is needed. The ground contact 54C provides a conducting path to a grounding source, which is independent of the normal current-carrying path of the electronic device 50.

The electronic device 50 is used in conjunction with a smart filter system 56 that includes a smart filter board 58 that stores payload information values related to timeout intervals based on hours, minutes, and seconds. These values are used to determine how long a user interface waits for communication from the smart filter system 56 before triggering a replace filter icon. In addition, sync user functionality is used to trigger a configuration of the smart filter system 56. Reconfiguration of the smart filter system 56 may be used to ensure that the application control unit, user interface, and smart filter are all using the same values. This information is all stored in the smart filter board 58 on the electronic device 50.

The electronic device 50 may use gold plating, or other conductive metals, on the contacts 54A, 54B, and 54C. The gold plating ensures a good connection with an extremely low ampere circuit in a potentially moist environment. Connector grease, or an equivalent, may be used to help isolate the contacts 54A, 54B, and 54C and avoid shorting of the contacts 54A, 54B, and 54C due to moisture. In addition, the protective cover 51 is implemented to protect the smart filter board 58 after installation into the filter head assembly 20. This protective cover 51 also protects the grease prior to being installed into the filter head assembly 20, and provides electrostatic discharge (ESD) protection. As a result of the isolated low voltage application in the smart filter system 56, the electronic device 50 is safe during the installation of the filter unit 12 into the filter head assembly 20.

Figure 3A:
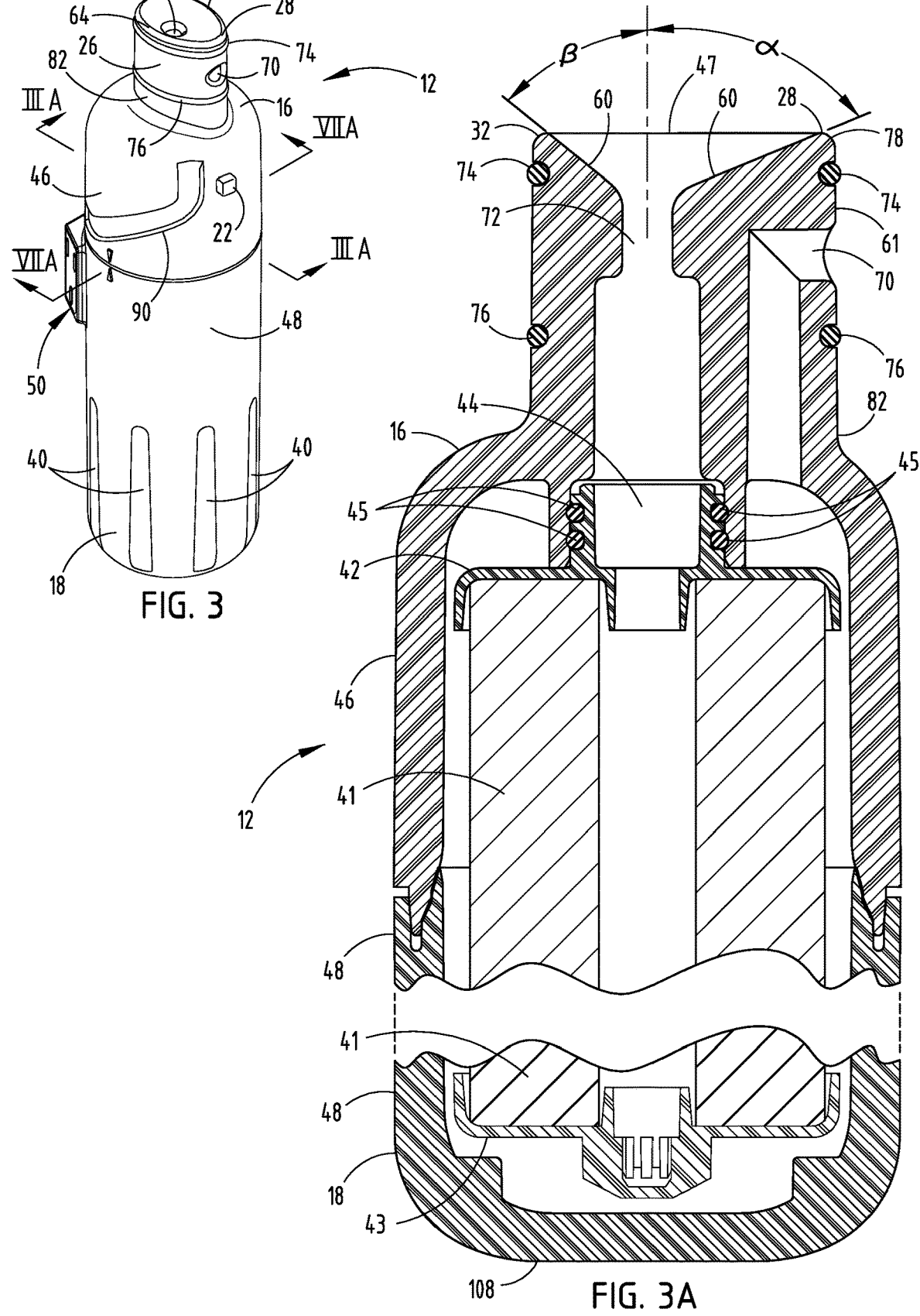
FIG. 3A is an enlarged cross-sectional view of the water filter of FIG. 3 taken at IIIA-IIIA.

Referring to FIGS. 3A and 7A, an engagement or end wall 60 of the engagement protrusion 26 is integral with a sidewall 61 of the engagement protrusion 26 and has a concave construction that tapers downwardly to an end aperture, which constitutes an outlet 72 of the filter unit 12. A side aperture, which constitutes an inlet 70, is positioned in the sidewall 61 of the engagement protrusion 26. For purposes of description, as viewed in FIGS. 3A and 7A, the filter unit 12 is described in an upright position, wherein the longitudinal axis of the filter unit 12 is in a substantially vertical orientation. In the illustrated embodiment, an angle $\alpha_2$ of the engagement wall 60 adjacent to the first portion 28 has an angle approximately 67.7 degrees from vertical. It is contemplated that the angle $\alpha_2$ could be as low as 15 degrees or as high as 90 degrees. An angle $\alpha_1$ of the engagement wall 60 of the engagement protrusion 26 at the second portion 32 of the engagement protrusion 26 is approximately 51 degrees, although it is contemplated that the angle $\alpha_1$ could be as low as 5 degrees or as high as 85 degrees. It will be noted that the degrees and constructions of the engagement wall 60 may vary from these specified angles and still be within the scope of the present invention. As shown in FIG. 7A, the angle $\theta$ of the engagement wall 60 in the engagement protrusion 26 is approximately 46.9 degrees from vertical on both third and fourth portions 64, 65 of the engagement protrusion 26. It is contemplated that the angle $\theta$ could be as low as 10 degrees or as high as 85 degrees. As illustrated, the first and second portions 28, 32 of the engagement protrusion 26 are not symmetrical, while the third and fourth portions 64, 65 of the engagement protrusion 26 are generally symmetrical.

Referring again to the embodiments of FIGS. 3A and 7A, the inlet 70 and the outlet 72 of the filter unit 12 have approximately the same diameter to dissipate extreme water pressure increases or decreases in the system. Nevertheless, it is contemplated that the diameter size of the inlet 70 and the outlet 72 could differ. Additionally, the engagement protrusion 26 includes first and second seals 74, 76, wherein the first seal 74 is disposed above the inlet 70 near a forward edge 78 of the engagement protrusion 26, and the second seal 76 is disposed between the inlet 70 and a base portion 82 of the engagement protrusion 26. Both the first and second seals 74, 76 extend around the sidewall 61 of the engagement protrusion 26. The first seal 74 keeps incoming unfiltered water entering the inlet 70 from cross-contaminating with exiting filtered water leaving the outlet 72. Therefore, the first seal 74 acts as a barrier, keeping the water to be filtered separate from the filtered water. The second seal 76 acts as a barrier that prevents filtered water from leaking around the body portion 14 during use.

Figure 8:
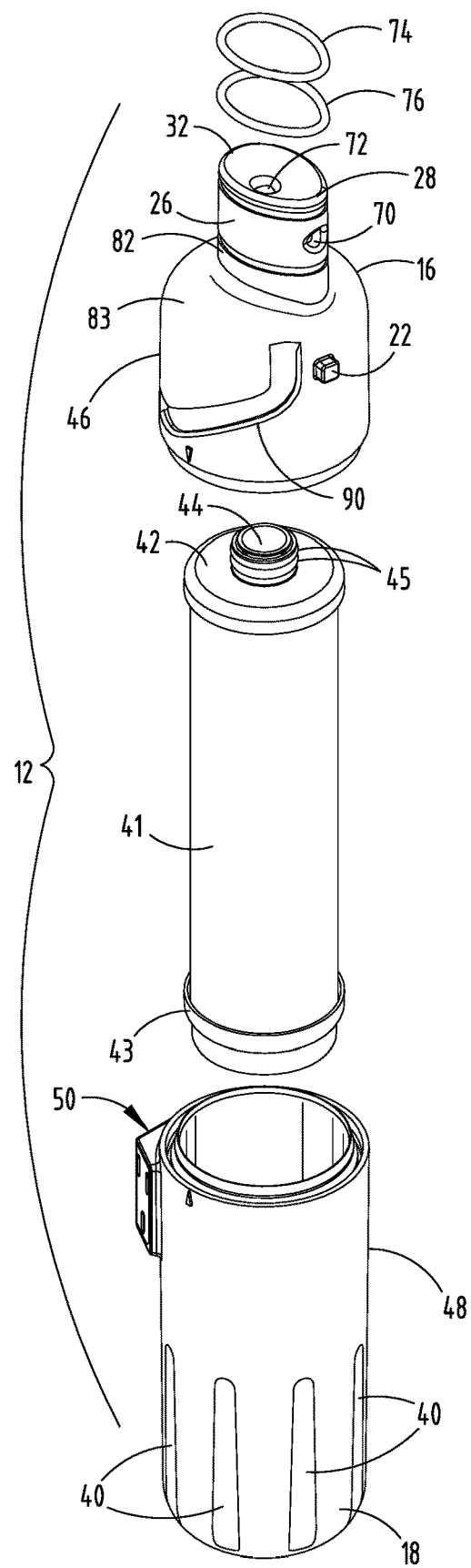
FIG. 8 is a top exploded perspective view of the water filter of FIG. 3.
Figure 13:
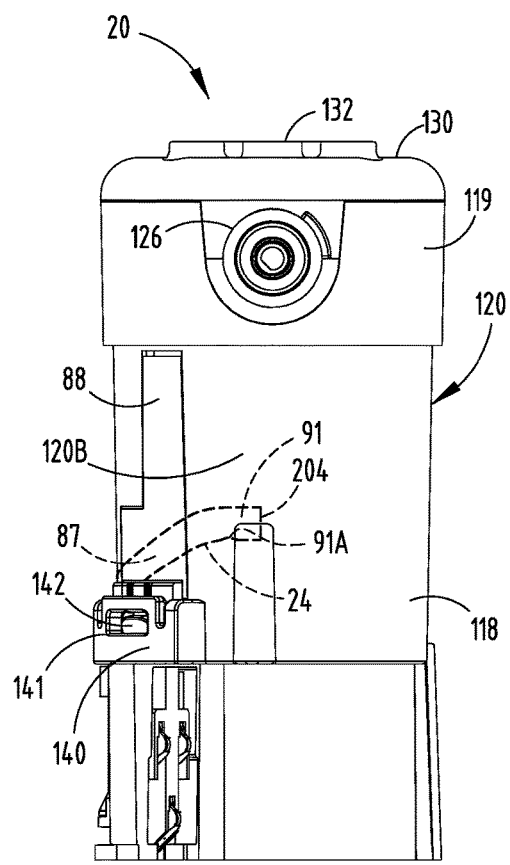
FIG. 13 is an elevational view of a first side of the filter head assembly of FIG. 11.
Figure 14:
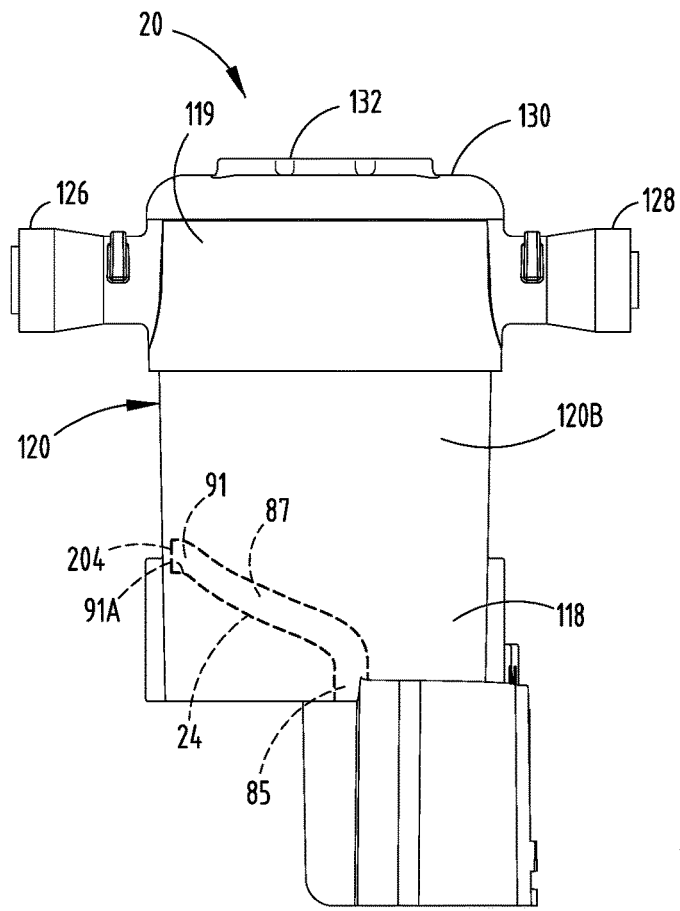
FIG. 14 is a rear elevational view of the filter head assembly of FIG. 11.
Figure 15:
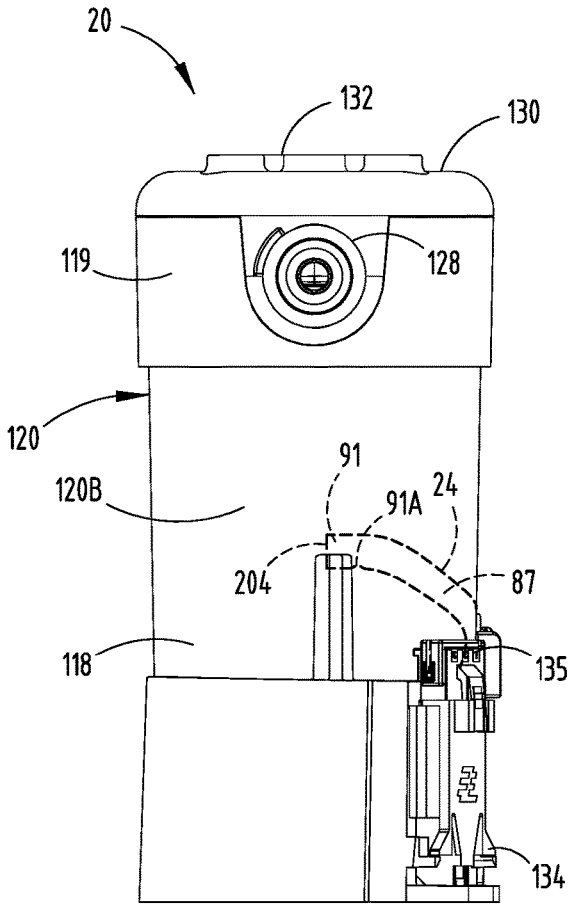
FIG. 15 is an elevational view of a second side of the filter head assembly of FIG. 11.
Figure 16:
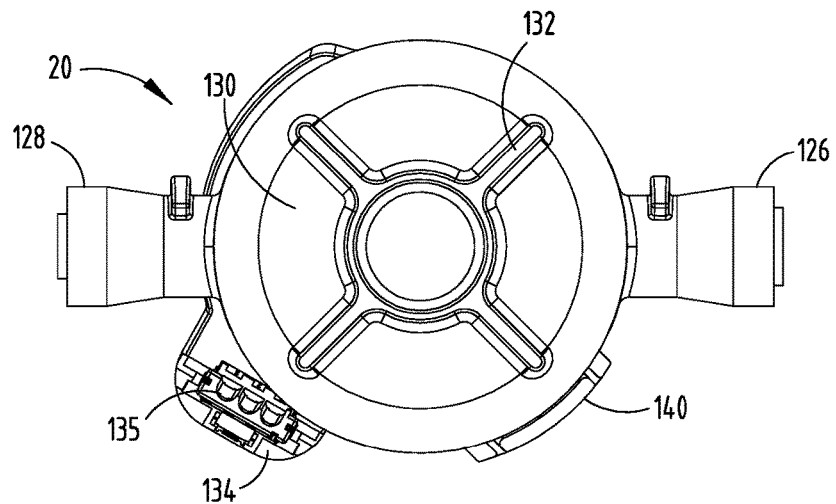
FIG. 16 is a bottom plan view of the filter head assembly of FIG. 11.

Referring now to FIGS. 4 and 6-7, a shoulder 83 (FIG. 8) on the proximal end 16 of the filter unit 12 includes the laterally extending key member 22, which is adapted to interface with and disengage an interference member 88 (FIG. 1) disposed in the filter head assembly 20, as outlined in further detail herein. The laterally extending key member 22, as illustrated, includes a square shape. The laterally extending key member 22 may extend out from the body portion 14 approximately 0.5 to 10 mm. In the illustrated embodiment, the laterally extending key member 22 extends out from the body portion 14 approximately 2.75 mm. However, it is contemplated that the shape of the laterally extending key member 22 could also be circular, oval, polygonal, etc. The laterally extending key member 22 includes a profile height that is adapted to be received in a key slot 24 inside the filter head assembly 20. The key slot 24 includes three segments that define the key slot 24 shape. A first segment 85 (FIG. 11) is substantially linear and parallel with the longitudinal extent of the filter head assembly 20. A second segment 87 (FIG. 11) extends at an angel between 0 degrees and 98 degrees relative to the longitudinal extent of the filter head assembly 20. A third segment 91 (FIG. 11) extends substantially laterally or normal to the longitudinal extent of the filter head assembly 20. The third segment 91 may angle back 0 degrees to 25 degrees to provide a detent-type configuration that is adapted to secure the laterally extending key member 22 in place in the key slot 24 of the filter head assembly 20. Additionally, as shown in FIG. 13, a retention nub 91A may be disposed in the third segment 91 to assist in securing the laterally extending key member 22 in place.

Figure 6A:
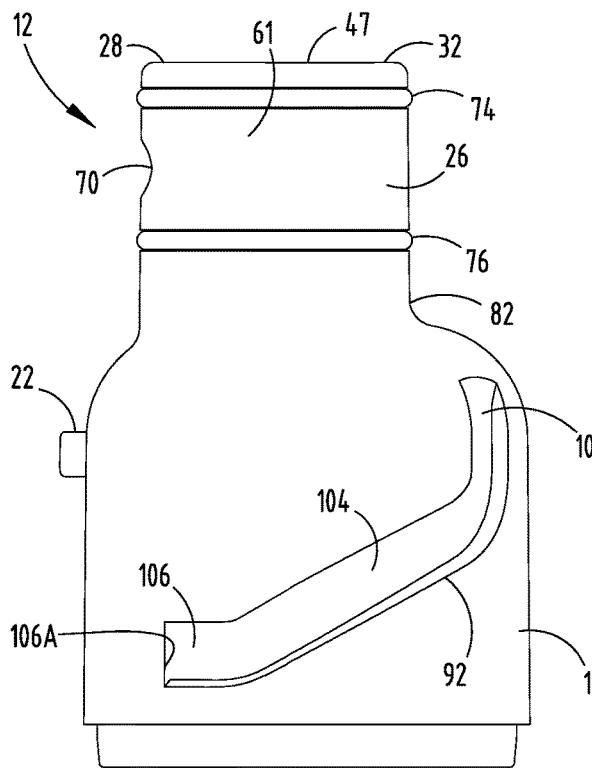
FIG. 6A is an enlarged elevational view of a second side of the forward casing of the water filter of FIG. 3.
Figure 6B:
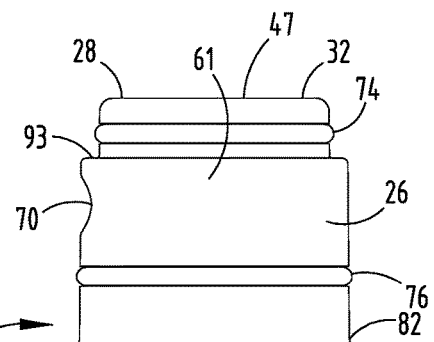
FIG. 6B is an enlarged elevational view of a second side of another embodiment of a forward casing of the water filter of FIG. 3.
Figure 6C:
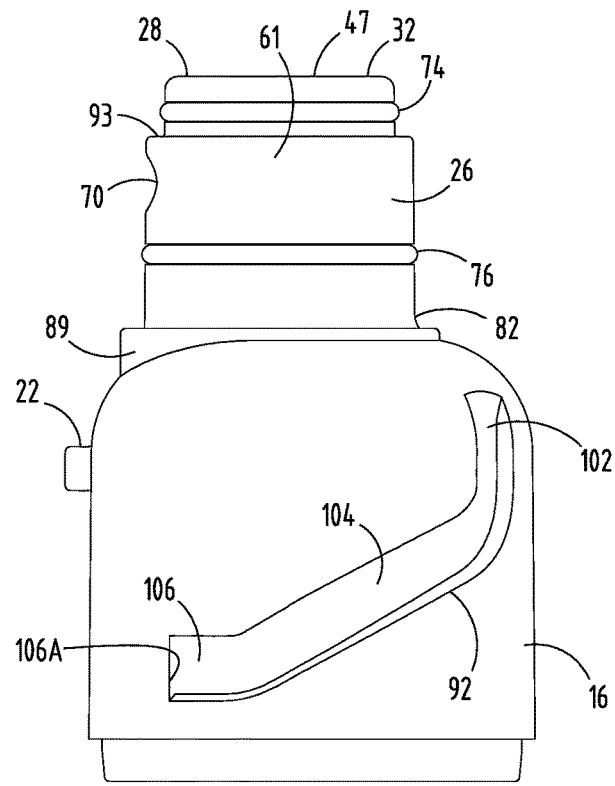
FIG. 6C is an enlarged elevational view of a second side of another embodiment of a forward casing of the water filter of FIG. 3.

As shown in the illustrated embodiment of FIG. 6A, the engagement protrusion 26 may include a straight walled construction designed to engage the filter head assembly 20 and be received in a filter head sleeve 156. In an alternative embodiment, as illustrated in FIG. 6B, the engagement protrusion 26 includes a stepped construction including a ledge 93 adapted to interface with a complementary receiving ledge 95 (FIG. 17A) in the filter head assembly 20. This design ensures that the first and second seals 74, 76 disengage the filter head assembly 20 at the same time.

As shown generally in FIGS. 4-10, first and second engagement surfaces 90, 92 are disposed on the filter unit 12 on opposite sides thereof. The illustrated embodiment depicts the first and second engagement surfaces 90, 92 in the form of channeled grooves. However, it is contemplated that the first and second engagement surfaces 90, 92 could be formed from externally protruding walls, or a combination of grooves and externally protruding walls, among other possible constructions. The first and second engagement surfaces 90, 92 are adapted to engage first and second guides 94, 96 (FIG. 11), respectively, juxtapositioned on an interior wall 99 (FIG. 17) that defines a receiving cavity 100 (FIG. 18) of the filter head assembly 20. Similar to the laterally extending key member 22, the first and second engagement surfaces 90, 92 are shown having a square shape. However, it is contemplated that the square shape of the first and second engagement surfaces 90, 92 could also be circular, oval, polygonal, etc. Similar to the key slot 24, the first and second engagement surfaces 90, 92 include three segments. Specifically, each of the first and second engagement surfaces 90, 92 includes a first segment 102 that is substantially linear and parallel with the longitudinal extent of the body portion 14 of the filter unit 12. A second segment 104 of the first and second engagement surfaces 90, 92 extends at an angle between 0 degrees and 90 degrees relative to the longitudinal extent of the body portion 14 of the filter unit 12. In the illustrated embodiment, the angle Δ (FIG. 4A) of the second segment 104 of the first and second engagement surfaces 90, 92 is 62 degrees from vertical. A third segment 106 of the first and second engagement surfaces 90, 92 extends substantially laterally or normal to the longitudinal extent of the body portion 14 of the filter unit 12. Alternatively, the third segment 106 may angle back 0 degrees to 25 degrees to provide a detent-type configuration that is adapted to secure the first and second guides 94, 96 in place after engagement of the filter unit 12 with the filter head assembly 20. Each of the first, second, and third segments 102, 104, and 106 of the first and second engagement surfaces 90, 92 provide a smooth engagement of the filter unit 12 with the filter head assembly 20 during installation of the filter unit 12, as discussed in further detail herein.

Figure 9:
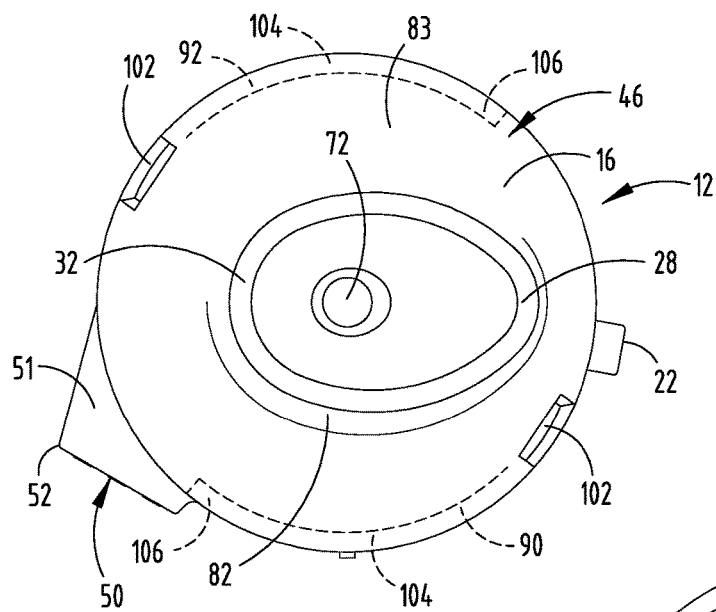
FIG. 9 is a top plan view of the water filter of FIG. 3.
Figure 10:
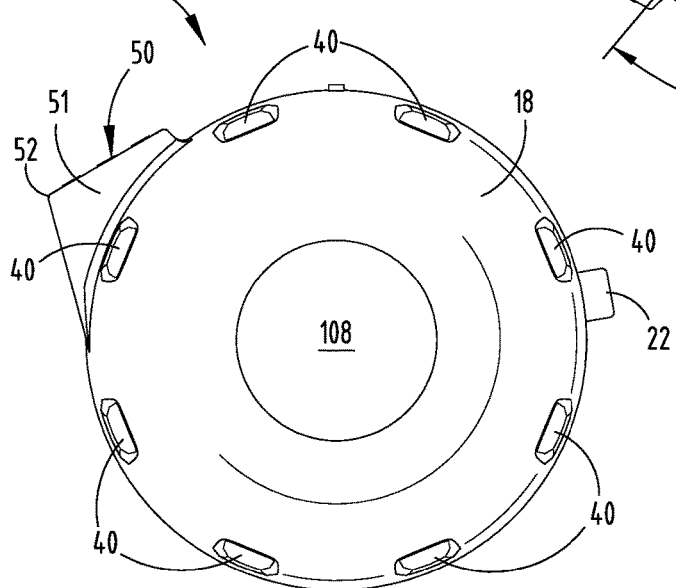
FIG. 10 is a bottom plan view of the water filter of FIG. 3.

As shown in FIG. 9, the first portion 28 of the engagement protrusion 26 has a first radius of curvature. The second portion 32 of the engagement protrusion 26 opposes the first portion 28 and has a second radius of curvature that is larger than the first radius of curvature. Thus, a cross-section of the engagement protrusion 26 taken perpendicular to the longitudinal extent of the filter unit 12 is generally egg-shaped. Stated differently, the engagement protrusion 26 includes a cross-section with only one axis of symmetry. Further, the laterally extending key member 22 is not aligned with, but instead is generally offset from, the inlet 70 of the engagement protrusion 26. The shoulder 83 of the filter unit 12 is generally rounded. However, the shoulder 83 can also be angled or have a more square construction. Alternatively, the shoulder 83 may include the shoulder support 89 that bears against the filter head sleeve 156. As shown in FIG. 10, the distal end 18 of the filter unit 12 is also generally rounded, but could include other constructions. A substantially planar portion 108 (FIG. 7A) is disposed at the distal end 18 of the filter unit 12, and allows the filter unit 12 to be placed in an upright position.

Figure 9A:
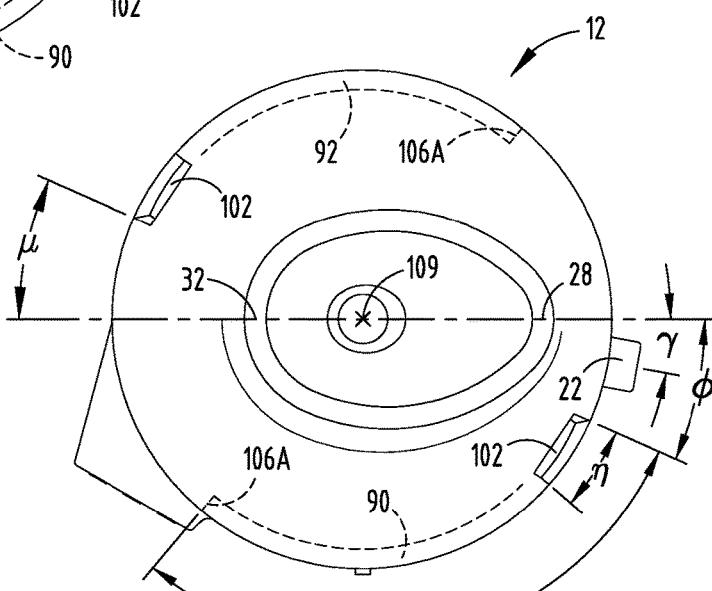
FIG. 9A is a top plan view of the water filter of FIG. 3.

Referring to FIG. 9A, the outlet 72 of the filter unit 12 is approximately centered or aligned with a central longitudinal axis 109 (FIG. 5) that extends centrally through the filter unit 12. A line from the central axis to the first portion 28 of the engagement protrusion 26 is generally defined to be at an angle of zero degrees. The laterally extending key member 22 is offset at an angle γ approximately 10 degrees from the first portion 28 of the engagement protrusion 26. The angle θ between the first portion 28 to the first segment 102 of the first engagement surface 90 is approximately 26 degrees. The first segment 102 includes an opening that extends across an angle Φ that is approximately 15 degrees of the shoulder 83 of the filter unit 12. The first engagement surface 90 extends across an angle β that is approximately 104 degrees from the opening of the first segment 102 to an abutment wall 106A adjacent the third segment 106. The first segment 102 of the first engagement surface 90 is approximately 180 degrees from the first engagement surface 90 of the second engagement surface 92. The angle μ taken from a line defined between the central longitudinal axis 109 to the second portion 32 is also 26 degrees. Thus, the angle between a line defined between the central longitudinal axis 109 and the first portion 28 to the first segment 102 of the second engagement surface 92 is 206 degrees (180 degrees plus 26 degrees).

Referring now to FIGS. 11-16, the filter head assembly 20 includes a filter unit receiving end 118 and a water receiving end 119. The filter head assembly 20 has a cylindrical receiver 120 that is defined by an interior wall portion 120A (FIG. 17) and an exterior wall portion 120B. The cylindrical receiver 120 is adapted to receive all or at least a portion of the proximal end 16 of the filter unit 12. An external circumference of the interior wall portion 120A includes an inlet port 122 (FIG. 18) and an outlet port 124 (FIG. 18) defined by opposing inlet and outlet extension members 126, 128, respectively. The inlet extension member 126 defines an inlet aperture 126A. In the illustrated embodiment, the inlet aperture 126A is 0.3125 inches. The outlet extension member 128 defines an outlet aperture 128A. In the illustrated embodiment, the outlet aperture 128A is 0.25 inches. The exterior wall portion 120B includes wall slots 129 (FIG. 18) that are sized to generally accommodate the inlet and outlet extension members 126, 128. Although the inlet and outlet extension members 126, 128 are shown on opposite sides of the filter head assembly 20, it is contemplated that the inlet and outlet extension members 126, 128 could be at any angle relative to one another and disposed at any position on the external circumference of the interior wall portion 120A. The cylindrical receiver 120 includes an end wall 130 positioned on the cylindrical receiver 120 proximate the water receiving end 119. Structural supports 132

(FIG. 16) are disposed on an external surface of the end wall 130. An electronic connector extends from an edge of the cylindrical sidewall 132 of the filter head assembly 20 and is adapted for engagement with the electronic device 50 on the filter unit 12. Additionally, a clip 134 is positioned on the exterior circumference of the filter head assembly 20 and is designed to support an electronic connector 135 on the filter head assembly 20. The electronic connector 135 is designed to receive information from and communicate information to the electronic device 50. The electronic connector 135 is removably connected with the clip 134, such as by a snap-fit connection, with the clip 134. Thus, the electronic connector 135 can be removed and replaced, if necessary.

Referring again to FIGS. 11-15, the key slot 24 is formed on an interior side of the exterior wall portion 120B. The key slot 24, as mentioned herein, is designed to receive the laterally extending key member 22 when the filter unit 12 is being inserted into the filter head assembly 20. In addition, the interference member 88 forms a portion of the exterior wall portion 120B, and is designed to prevent a filter unit that lacks a laterally extending key member from engaging the filter head assembly 20. The interference member 88 includes an abutment catch 136 (FIG. 17) disposed at a distal end of the interference member 88 at an interior side of the interference member 88. The abutment catch 136 includes an abutment wall 137 (FIG. 17) and a sloped wall 138. The interference member 88 is connected to the exterior wall portion 120B proximate the filter unit receiving end 118. A portion of the key slot 24 extends along an interior side of the interference member 88. As illustrated, the interference member 88 is connected with the exterior wall portion 120B by a securing clip 140 (FIG. 18). The securing clip 140 includes an aperture 141 (FIG. 18) adapted to receive a clip protuberance 142 (FIG. 18) disposed on the interference member 88. However, it is contemplated that the interference member 88 could be connected in other manners, such as by a living hinge, adhesive, mechanical fasteners, etc.

Figure 17:
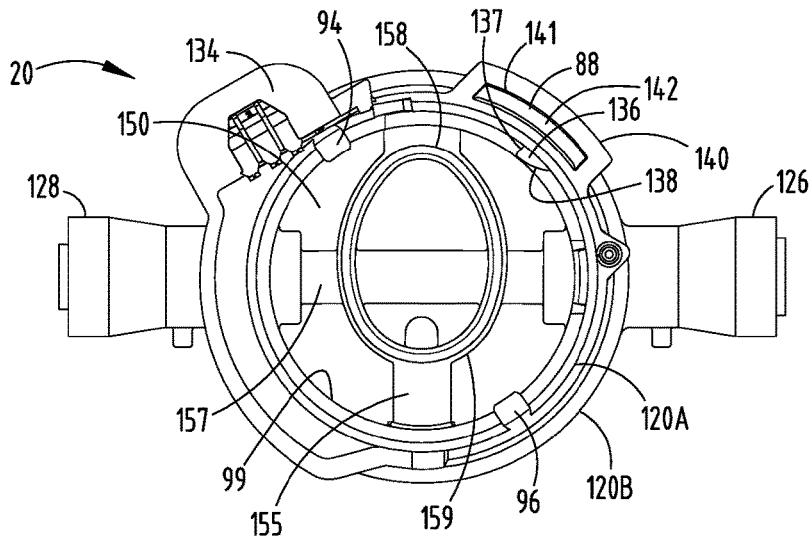
FIG. 17 is a top plan view of the filter head assembly of FIG. 11.
Figure 18:
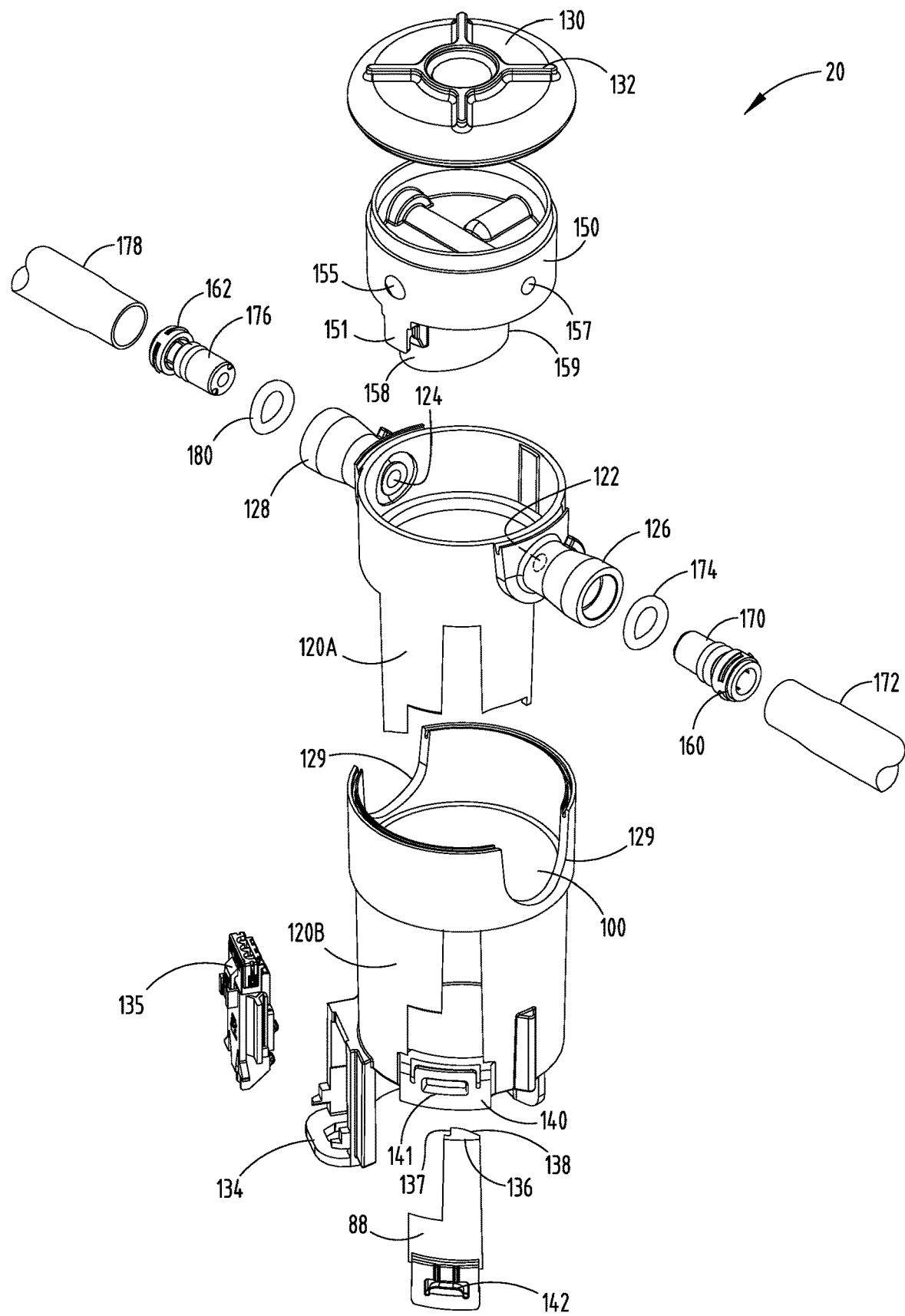
FIG. 18 is an exploded top perspective view of the filter head assembly of FIG. 11.
Figure 19:
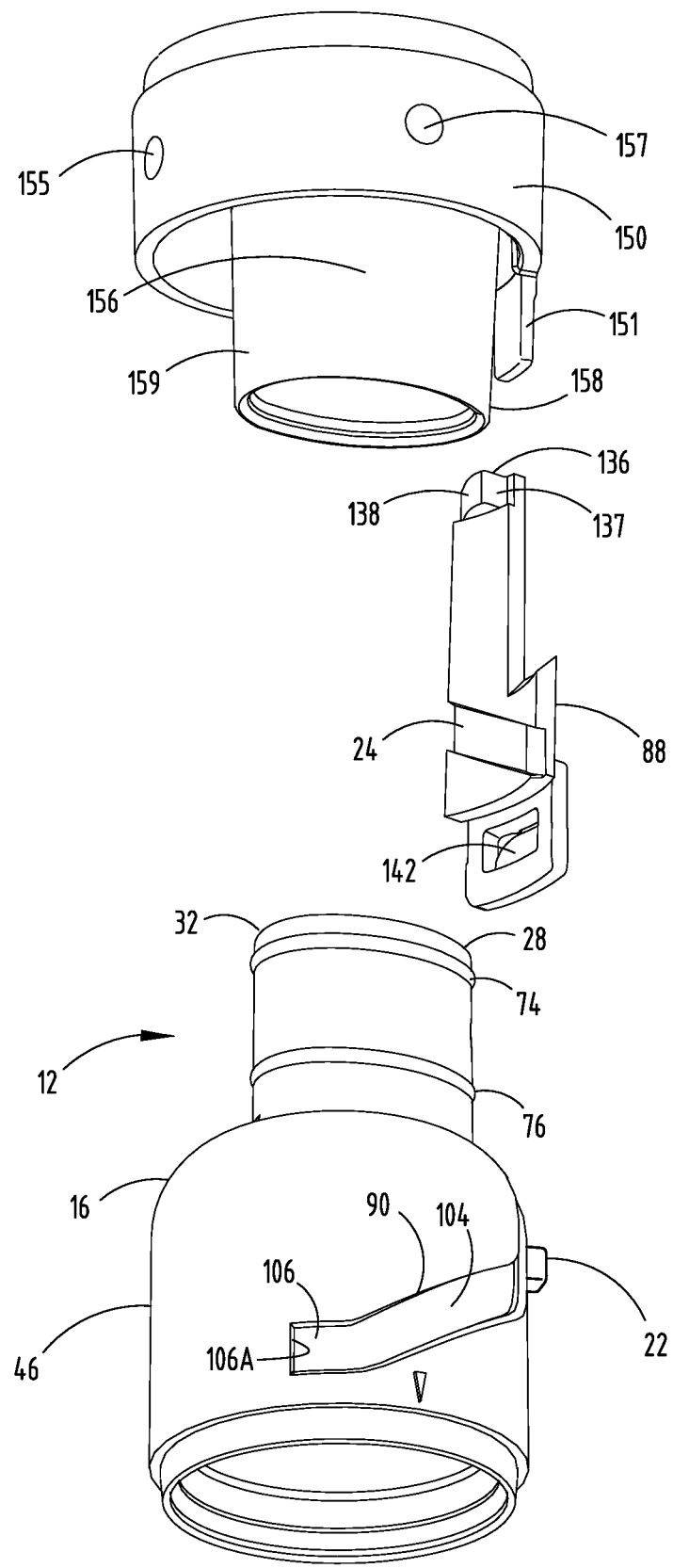
FIG. 19 is a bottom exploded perspective view of engaging components of the filter head assembly and filter unit.
Figure 22A:
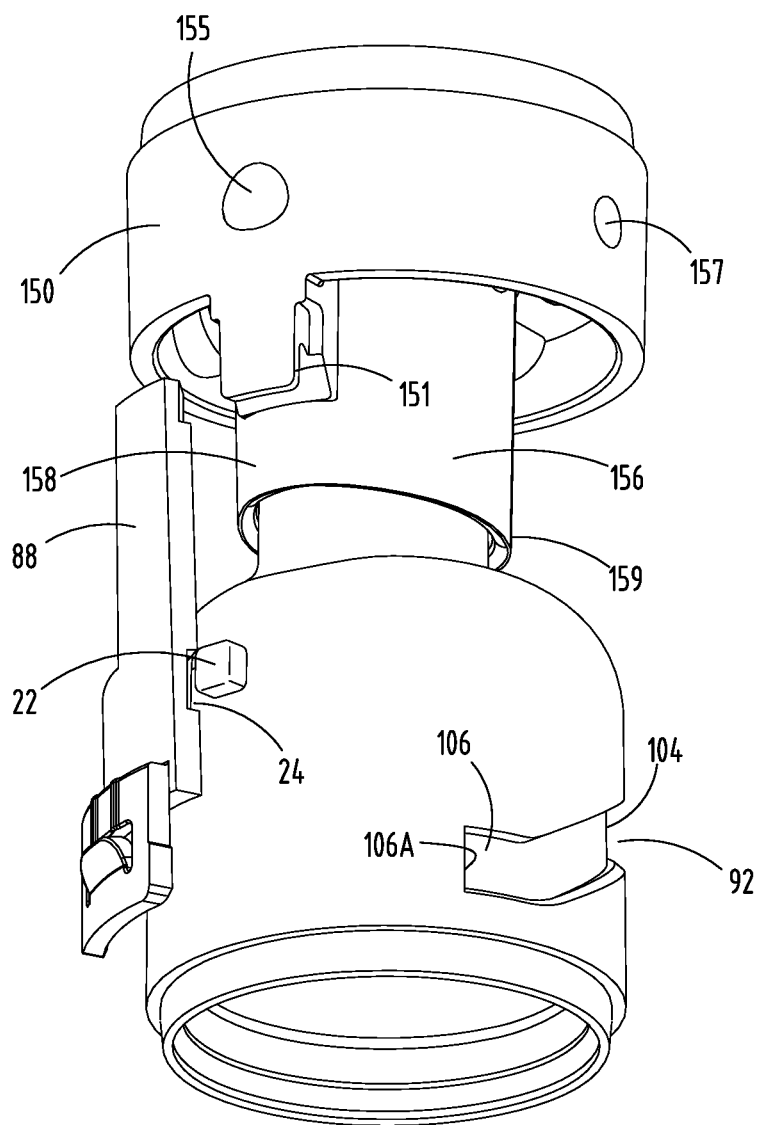
FIG. 22A is an enlarged side perspective view of engaging components of the filter head assembly and filter unit fully engaged.
Figure 22B:
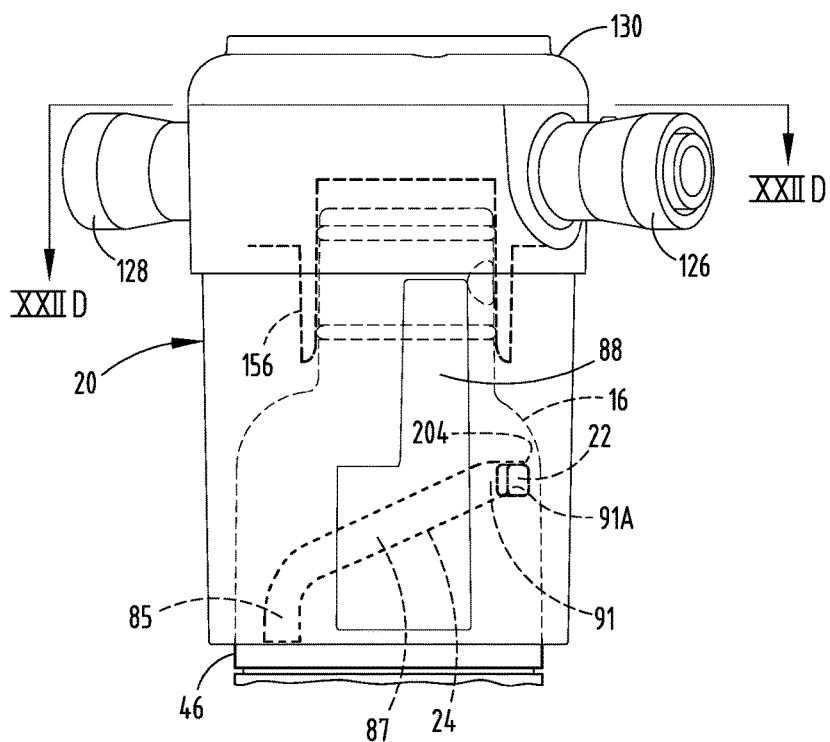
FIG. 22B is a side elevational view of a filter unit in full engagement with the filter head assembly illustrating the lateral engagement key member and key slot fully engaged.
Figure 22C:
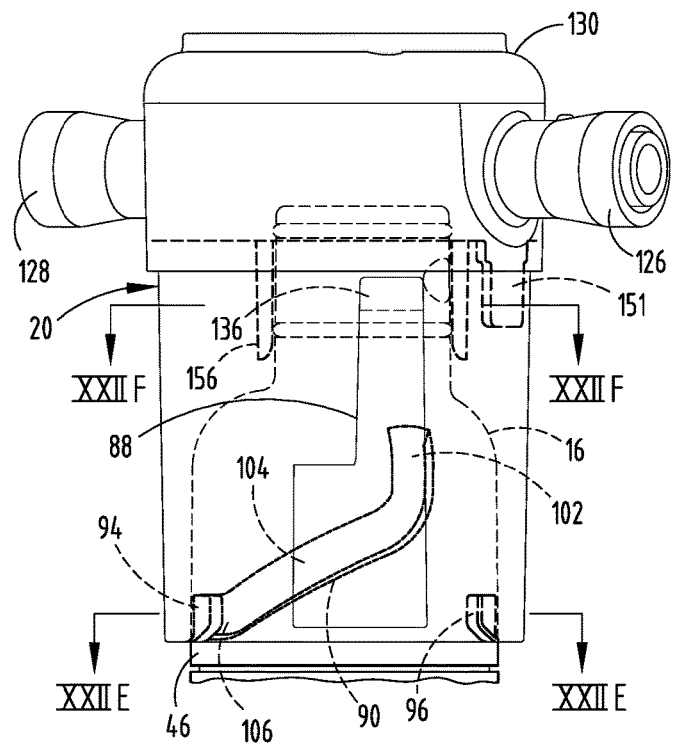
FIG. 22C is a side elevational view of the filter unit in full engagement with the filter head assembly illustrating the first and second guides and the first and second engagement surfaces fully engaged.
Figure 22D:
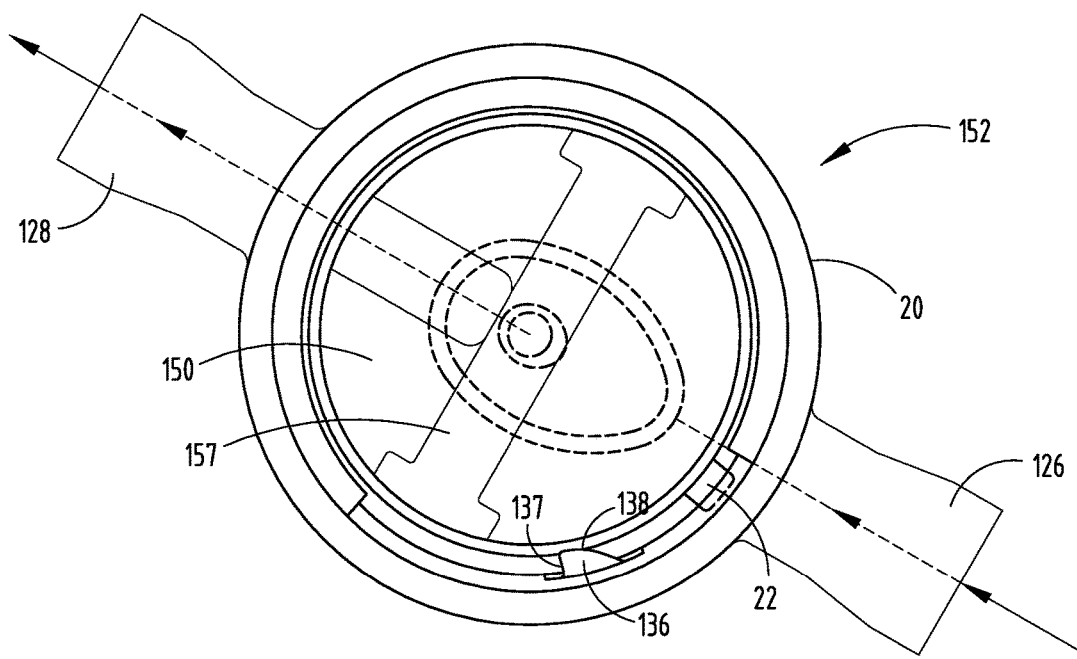
FIG. 22D is a cross-sectional view of the filter head assembly of FIG. 22B taken at XXIID-XXIID.
Figure 22E:
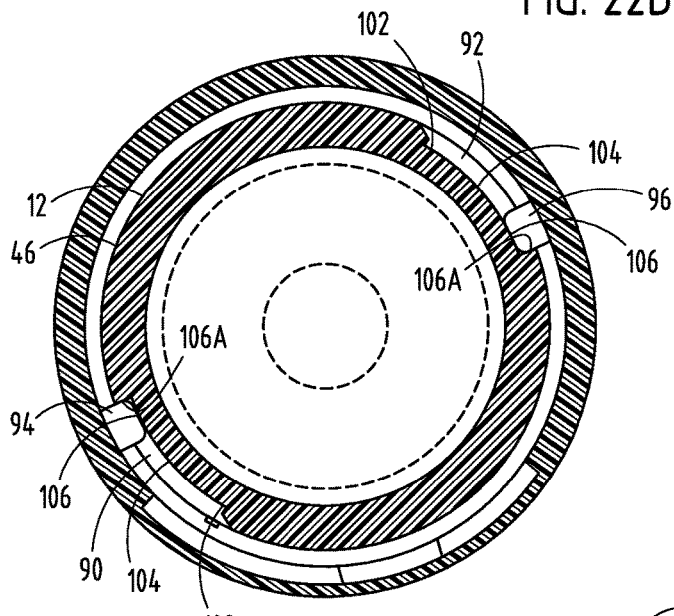
FIG. 22E is a cross-sectional view of the filter head assembly of FIG. 22C taken at XXIIE-XXIIE.
Figure 22F:
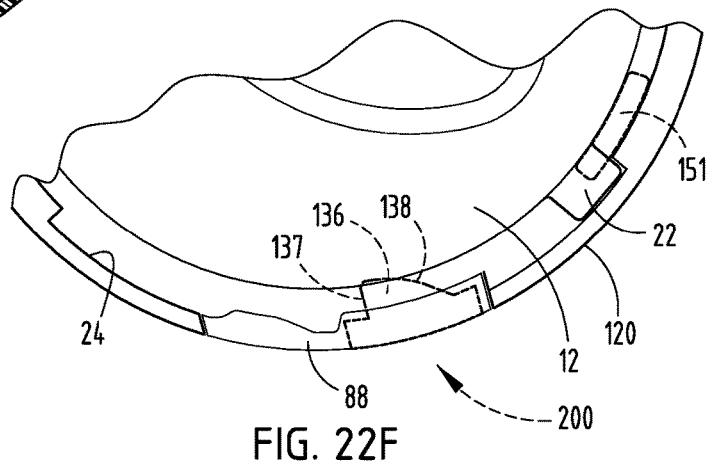
FIG. 22F is a partial cross-sectional view of the filter head assembly of FIG. 22C taken at XXIIF-XXIIF.
Figure 23:
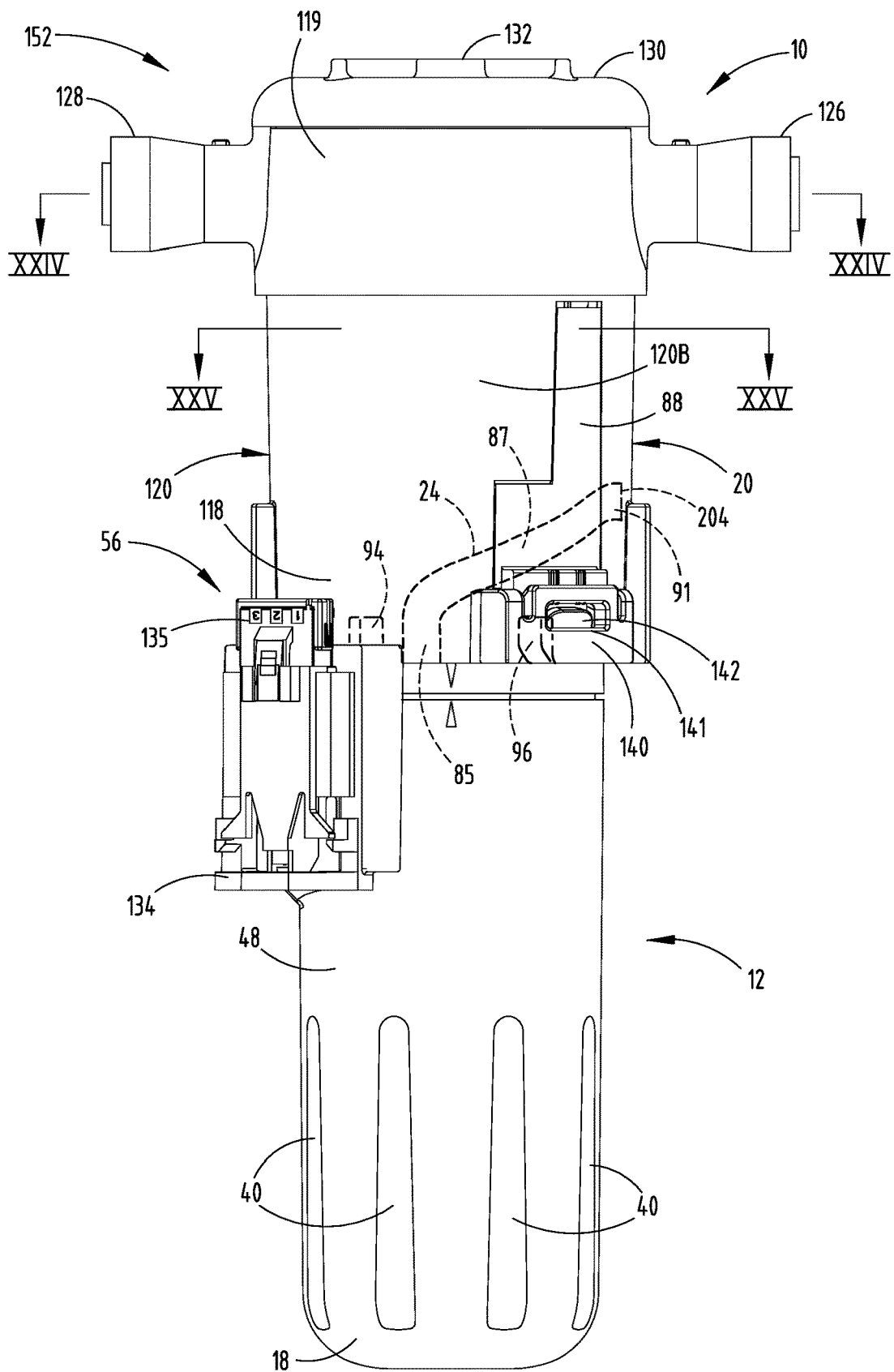
FIG. 23 is a front elevational view of the water filter system with the water filter fully installed into the filter head assembly.
Figure 24:
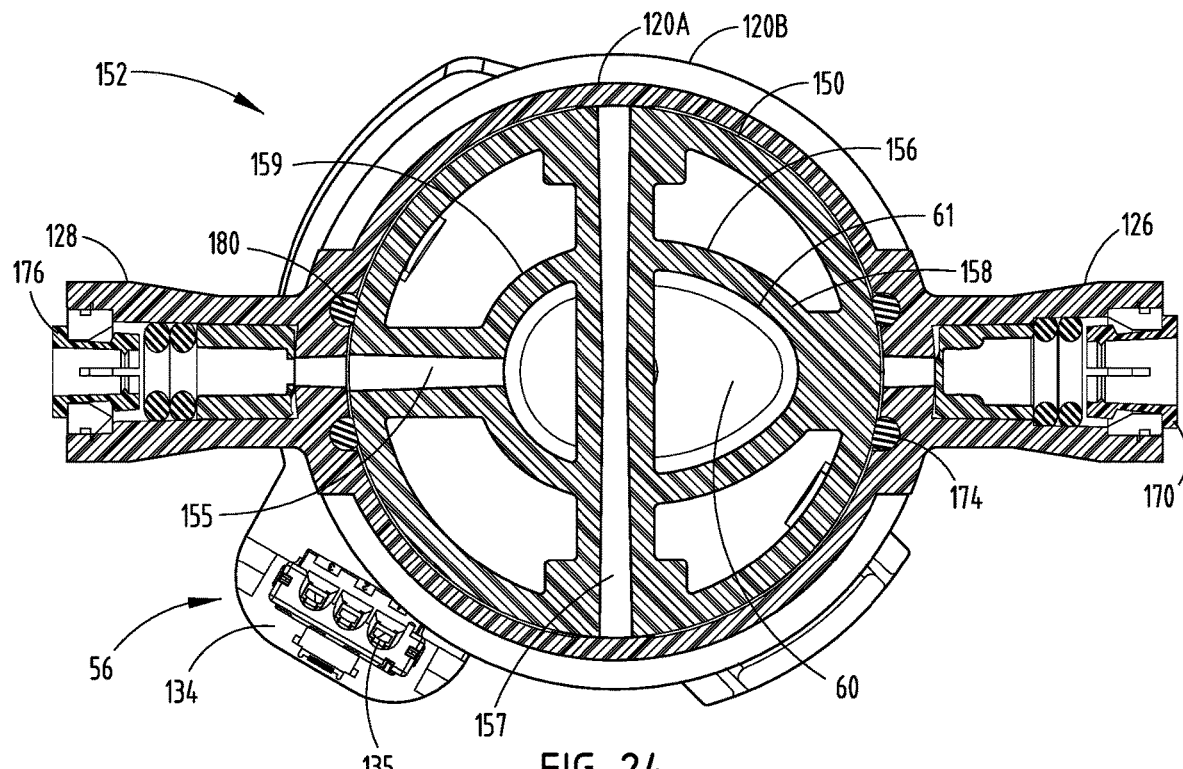
FIG. 24 is an enlarged cross-sectional view of the water filter of FIG. 23 taken at XXIV-XXIV.
Figure 25:
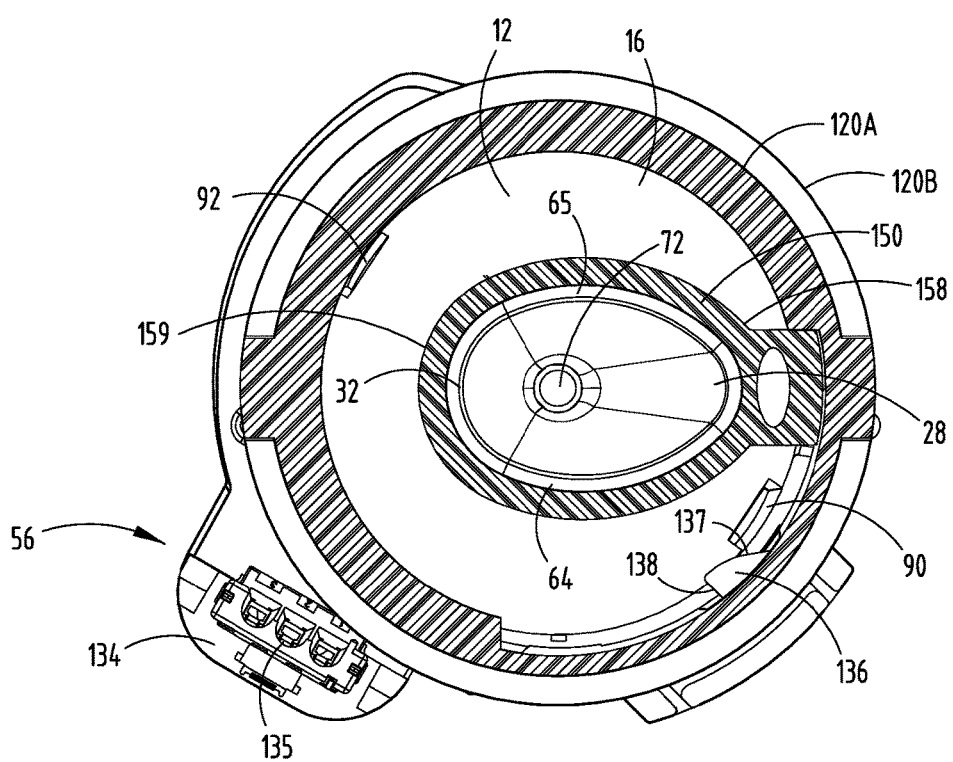
FIG. 25 is an enlarged cross-sectional view of the water filter of FIG. 17 taken at XXV-XXV.
Figure 26:
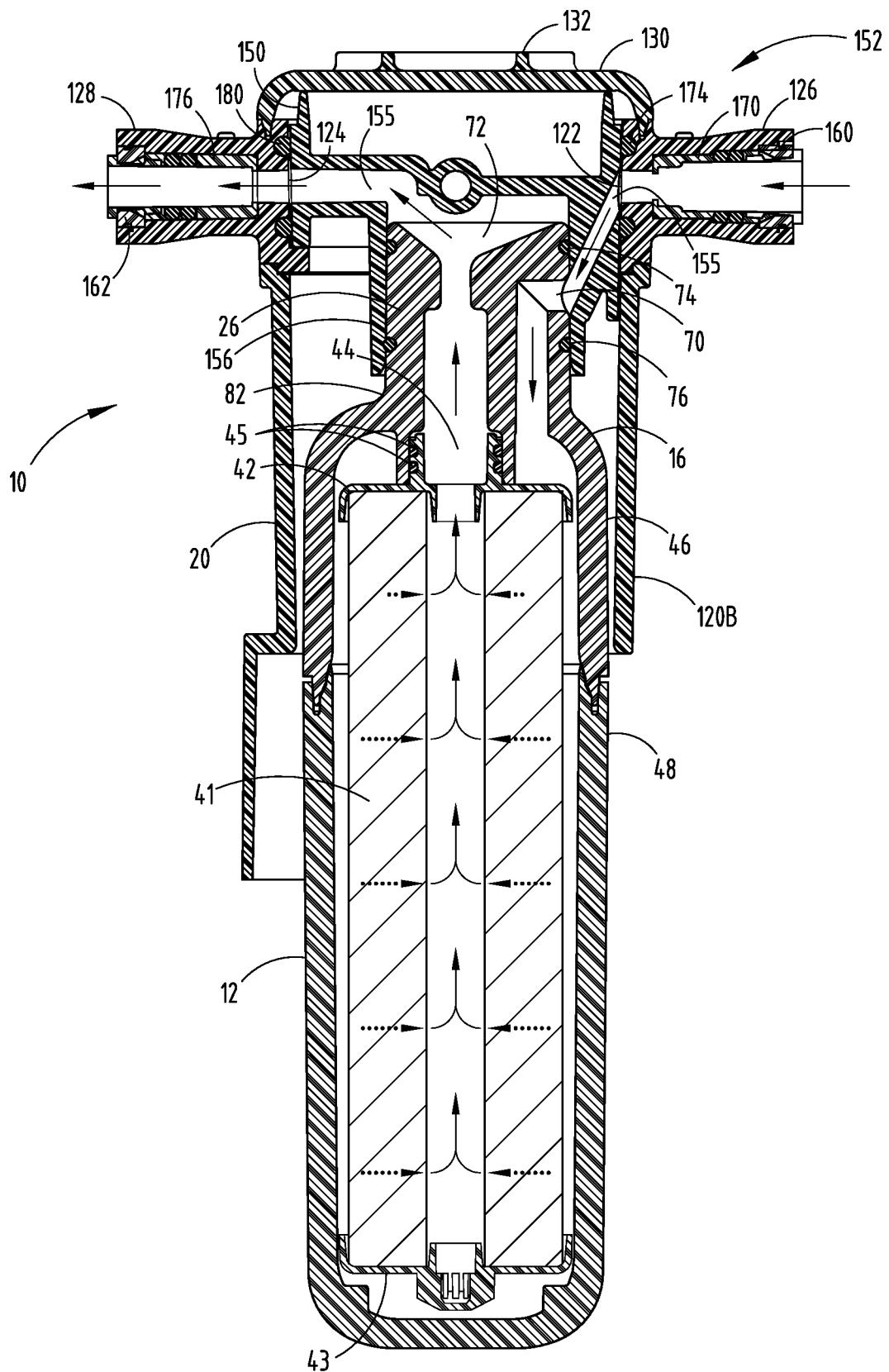
FIG. 26 is a side cross-sectional view of a filter unit fully installed into the filter head assembly.

Turning now to FIGS. 17-19, the filter head assembly 20 also includes a filter receiver 150 with a stop member 151. The filter receiver 150 is rotatable inside the filter head assembly 20 between a filtering position 152 (FIG. 22D) and a bypass position 154 (FIG. 20D), wherein unfiltered water passes through the filter head assembly 20 when the filter unit 12 is not installed. The filter head assembly 20 also includes the filter head sleeve 156, which has a cross-section that complements the shape of the engagement protrusion 26. Generally stated, the cross-section of the filter head sleeve 156 is egg-shaped. More specifically, the filter head sleeve 156 includes a first portion 158 that includes a first radius of curvature and a second portion 159 opposing the first portion 158 that includes a second radius of curvature that is larger than the first radius of curvature. Thus, the filter head sleeve 156 includes a cross-section with only one axis of symmetry. The filter head sleeve 156 is sized slightly larger than the engagement protrusion 26 such that the filter head sleeve 156 can closely receive and retain the engagement protrusion 26 and maintain a watertight seal with the aid of the first and second seals 74, 76.

Figure 17A:
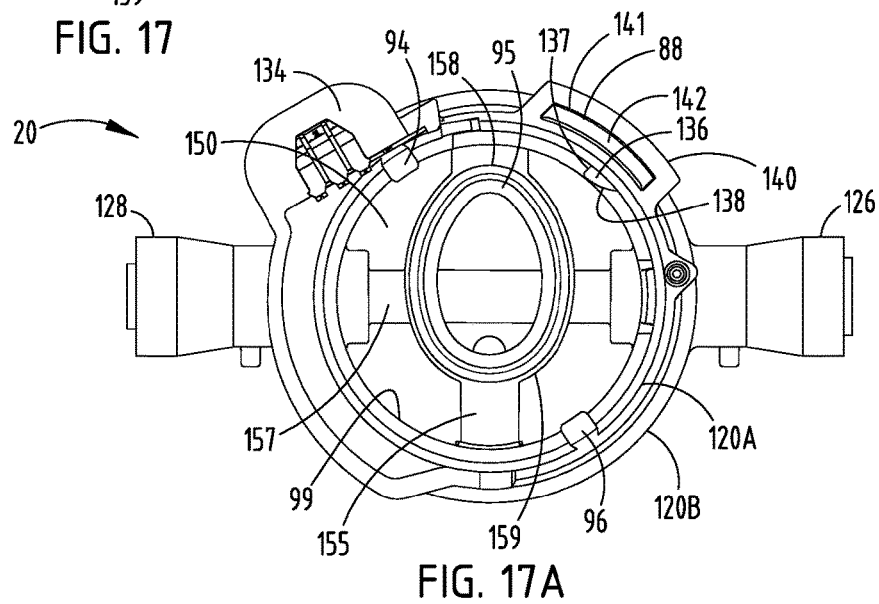
FIG. 17A is a top plan view of another embodiment of the filter head assembly of FIG. 11.

In an alternative embodiment, as illustrated in FIG. 17A, the filter head sleeve 156 may include the stepped construction briefly mentioned above with reference to FIG. 6A, such that the filter head sleeve 156 includes the receiving ledge 95, which is adapted to engage and abut the ledge 93 on the engagement protrusion 26. During insertion, the stepped construction of both the filter head sleeve 156 and the engagement protrusion 26 allows the first and second seals 74, 76 to engage the filter head sleeve 156 simultaneously. Similarly, during removal, the stepped construction allows the first and second seals 74, 76 to disengage the filter head sleeve 156 simultaneously.

Referring again to FIGS. 17-19, the filter receiver 150 includes a filtering pathway 155 and a bypass channel 157. The bypass channel 157 allows water to flow through the filter head assembly 20 without being filtered. The filter head sleeve 156 of the filter receiver 150 is disposed inside the filter head assembly 20. The inlet and outlet extension members 126, 128 include couplings 160, 162 adapted to interface with an inlet water conduit 172 and an outlet water conduit 178, respectively. The coupling 160 includes an insert 170 that connects with the inlet extension member 126. The insert 170 is sealed by a gasket 174. The coupling 162 includes an insert 176 that connects with the outlet extension member 128. The insert 176 is sealed by a gasket 180. The gaskets 174, 180 of the inlet and outlet extension members 126, 128, respectively, keep water from leaking out of the inlet and outlet extension members 126, 128.

Figure 20A:
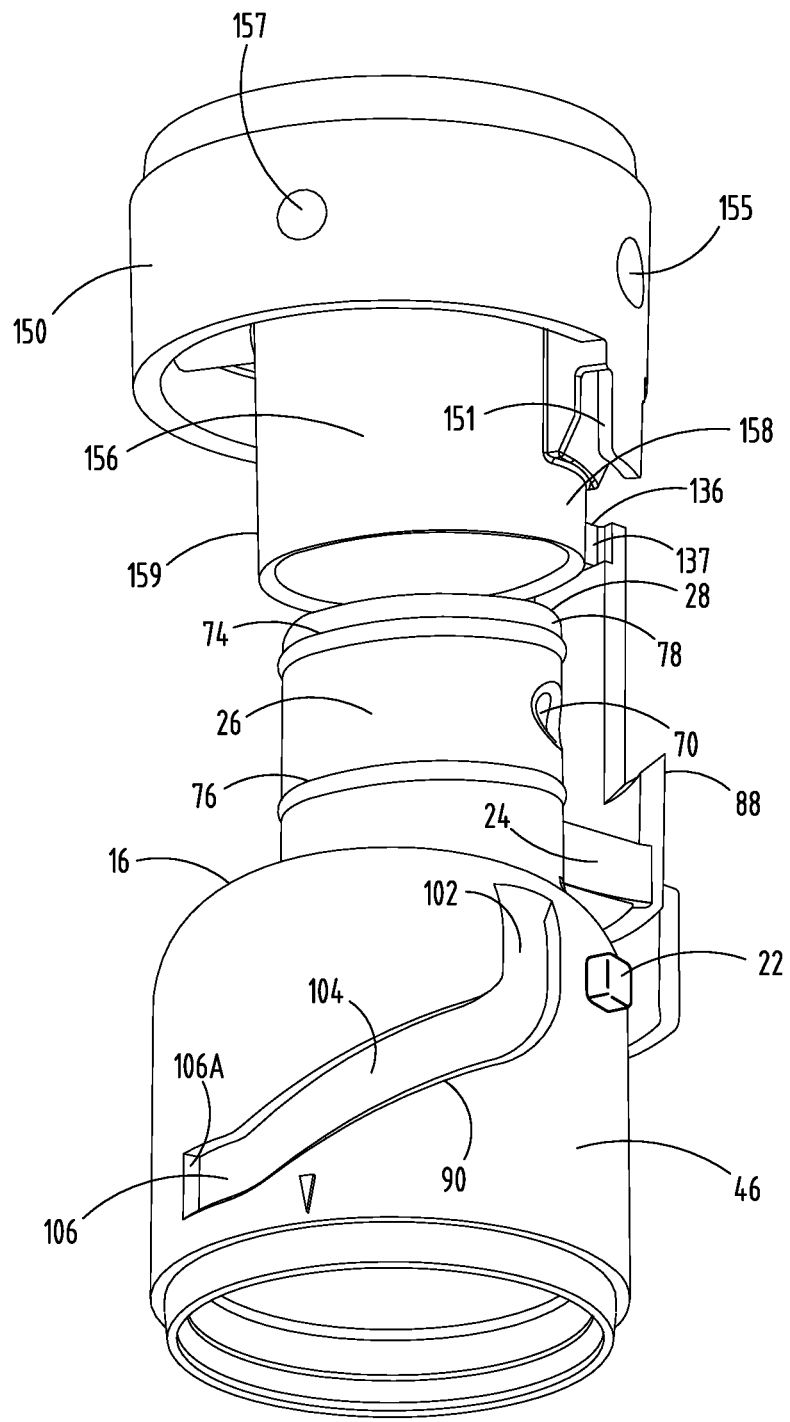
FIG. 20A is an enlarged side perspective view of engaging components of the filter head assembly and filter unit prior to engagement.
Figure 20B:
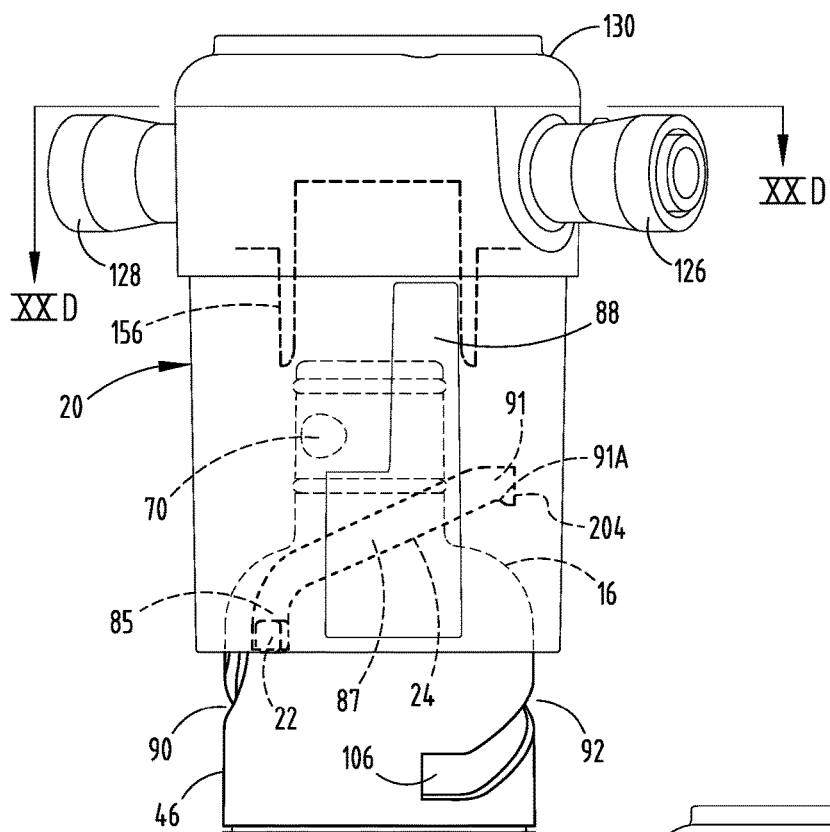
FIG. 20B is a side elevational view of a filter unit prior to engagement with the filter head assembly illustrating the lateral engagement key member and key slot prior to engagement.
Figure 20C:
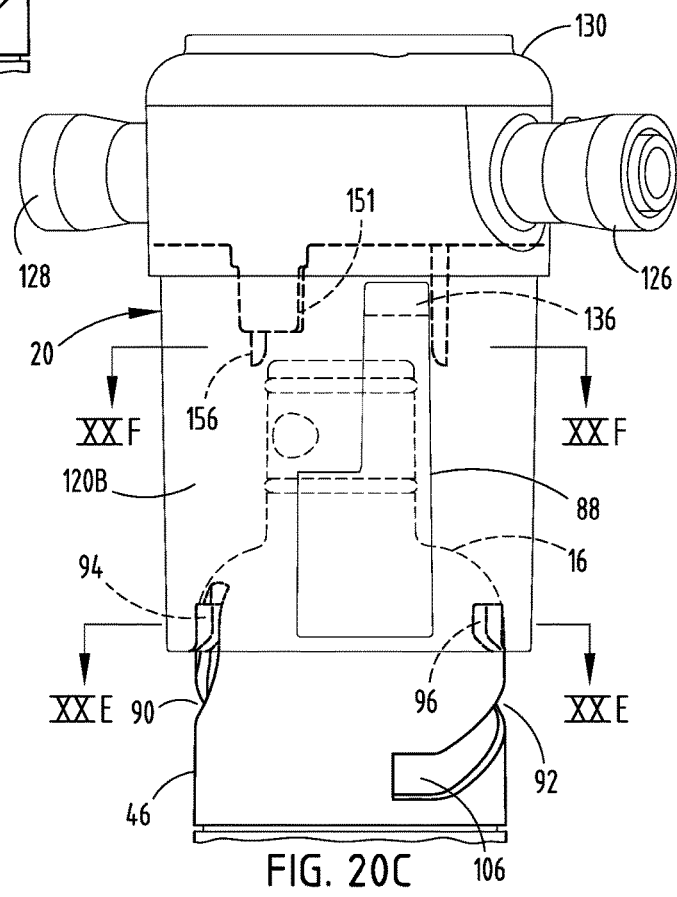
FIG. 20C is a side elevational view of the filter unit prior to engagement with the filter head assembly illustrating the first and second guides and the first and second engagement surfaces prior to engagement.
Figure 20D:
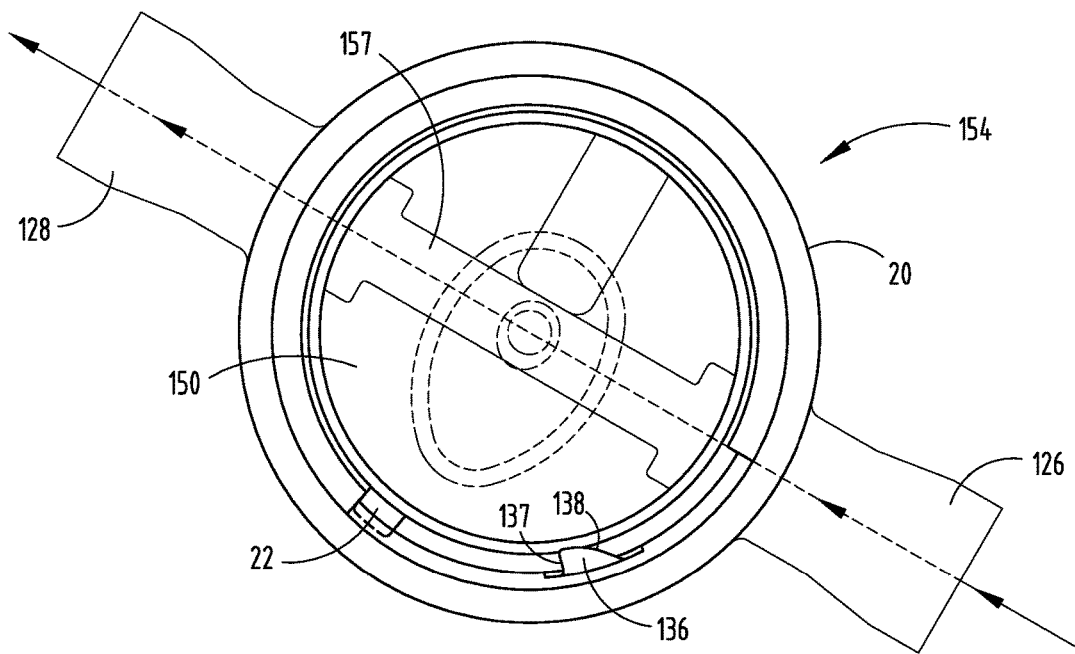
FIG. 20D is a cross-sectional view of the filter head assembly of FIG. 20B taken at XXD-XXD.
Figure 20E:
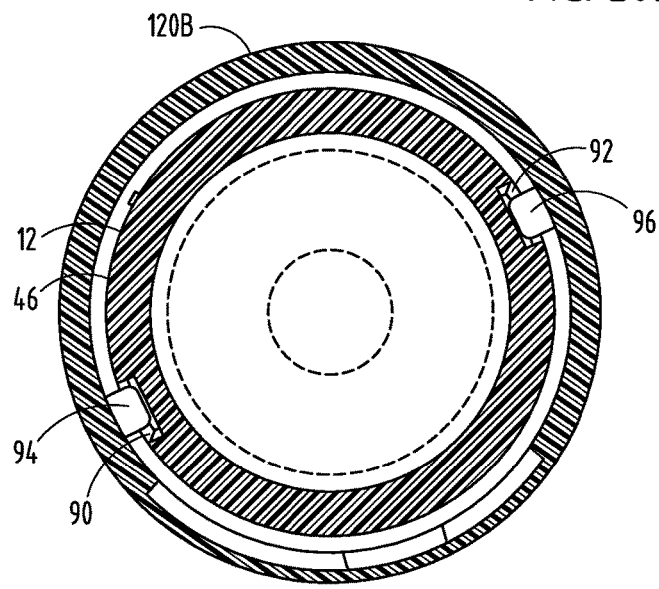
FIG. 20E is a cross-sectional view of the filter head assembly of FIG. 20C taken at XXE-XXE.
Figure 20F:
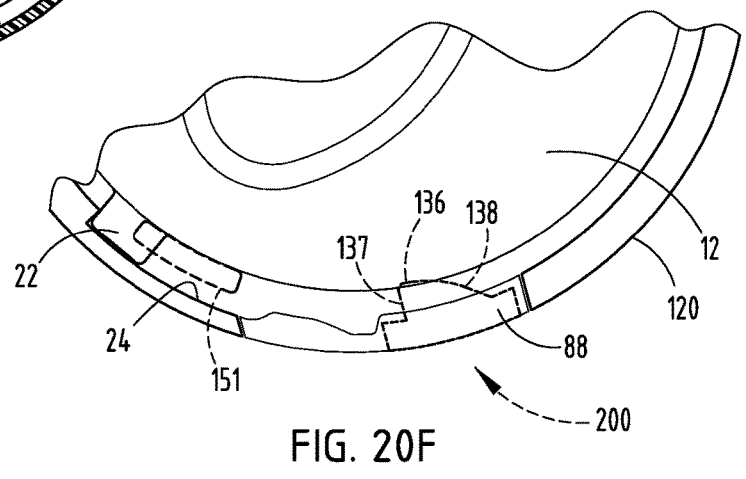
FIG. 20F is a partial cross-sectional view of the filter head assembly of FIG. 20C taken at XXF-XXF.
Figure 20G:
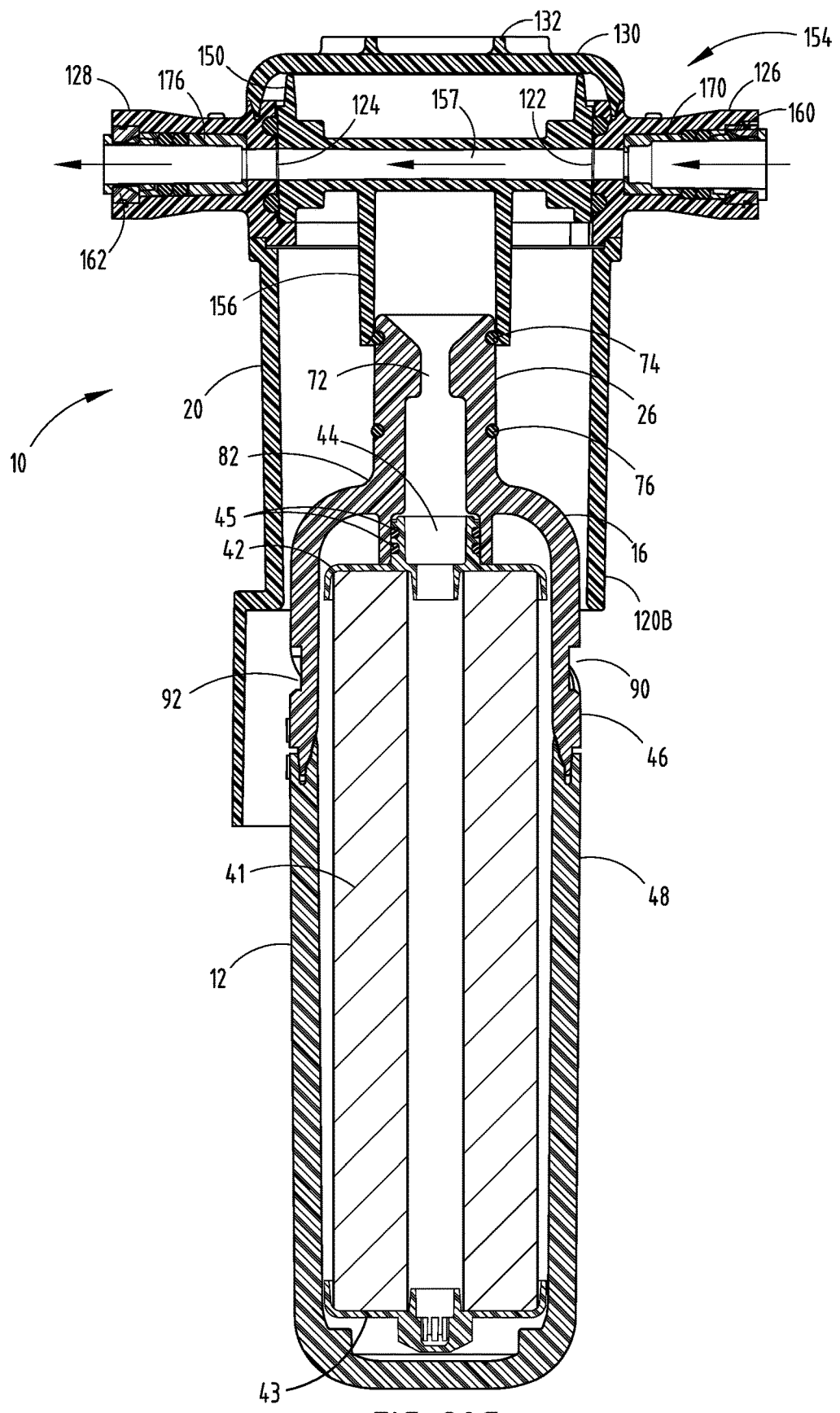
FIG. 20G is a side cross-sectional view of a filter unit prior to installation into a head assembly.

Referring to FIGS. 19 and 20A, during installation of the filter unit 12 with the filter head assembly 20, the filter unit 12 is oriented such that the engagement protrusion 26 is aligned with the filter receiver 150 and specifically aligned with the filter head sleeve 156, which includes an egg-shaped cross-section that complements the egg-shaped cross-section of the engagement protrusion 26, as outlined herein. Alignment of the engagement protrusion 26 with the filter head sleeve 156 results in alignment of the laterally extending key member 22 with the key slot 24, as well as alignment of the first and second guides 94, 96 with the first and second engagement surfaces 90, 92, as shown in FIGS. 20B, 20C, and 20E. In this position, the abutment catch 136 on the interference member 88 is in an interference position 200, as shown in FIGS. 20D and 20F. In addition, the engagement protrusion 26 is in only slight engagement with the filter head sleeve 156 of the filter receiver 150, as shown in FIG. 20G.

Figure 21A:
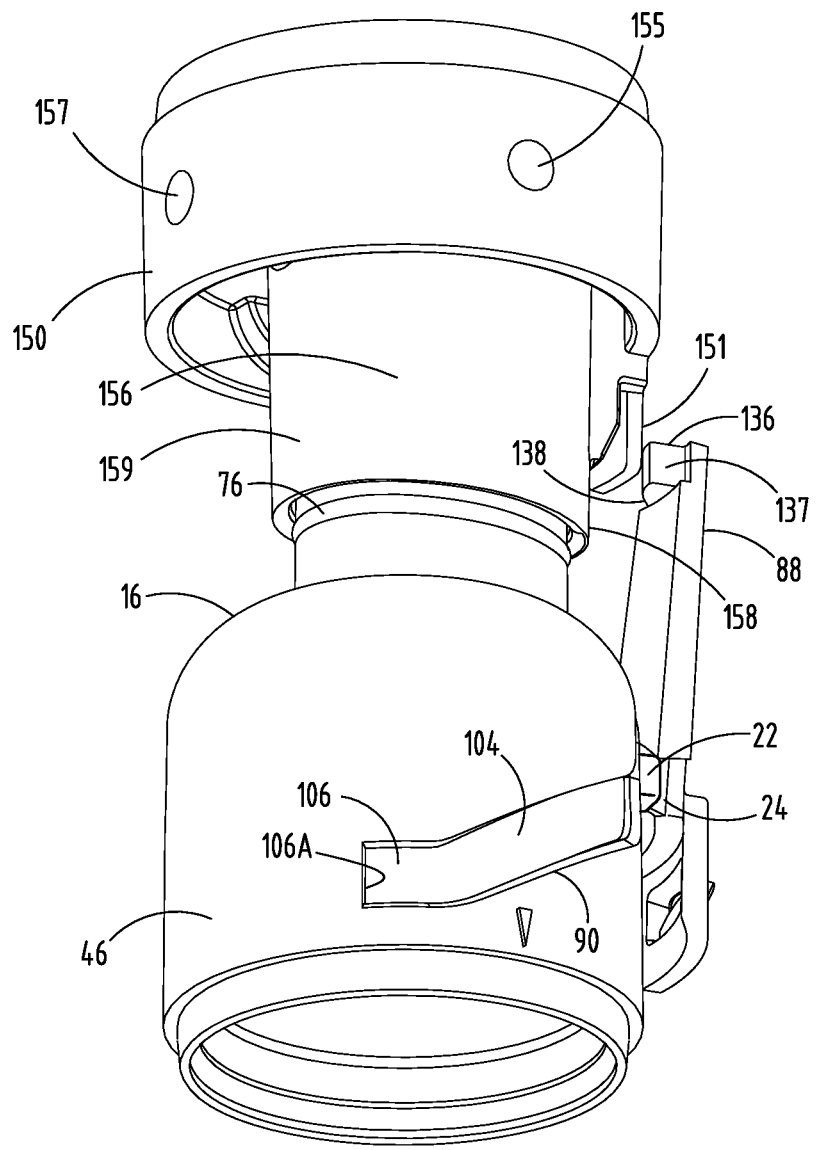
FIG. 21A is an enlarged side perspective view of engaging components of the filter head assembly and filter unit during engagement.
Figure 21B:
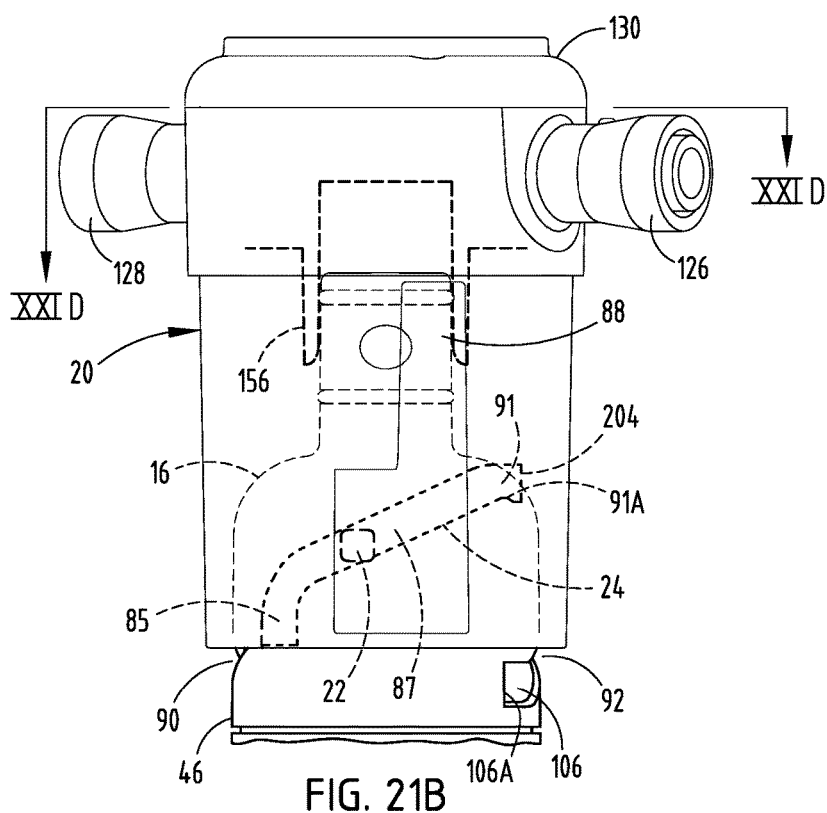
FIG. 21B is a side elevational view of a filter unit during engagement with the filter head assembly illustrating the lateral engagement key member and key slot engaging.
Figure 21C:
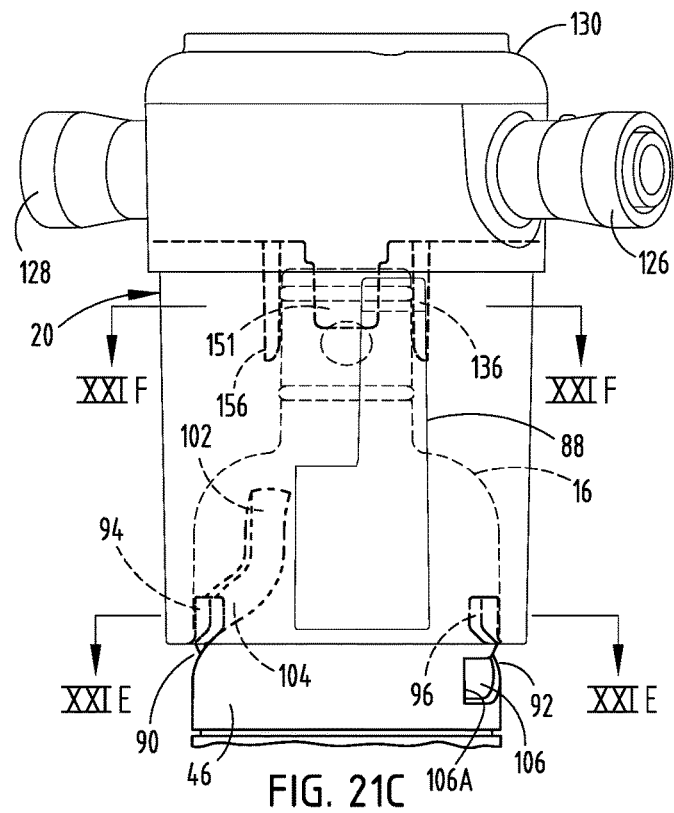
FIG. 21C is a side elevational view of the filter unit during engagement with the filter head assembly illustrating the first and second guides and engaging the first and second engagement surfaces engaging.
Figure 21D:
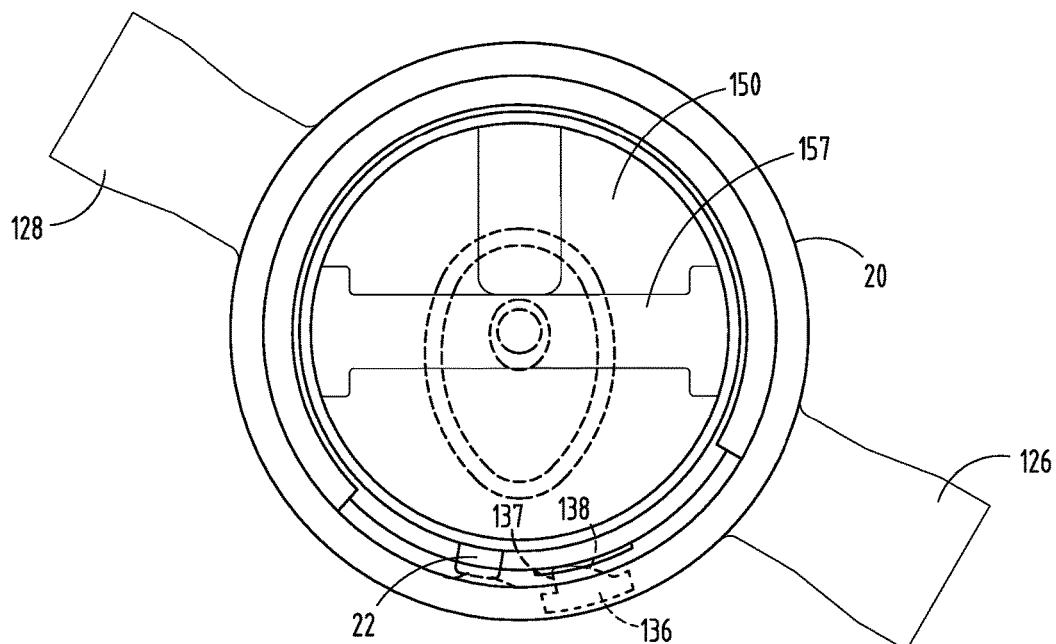
FIG. 21D is a cross-sectional view of the filter head assembly of FIG. 21B taken at XXID-XXID.
Figure 21E:
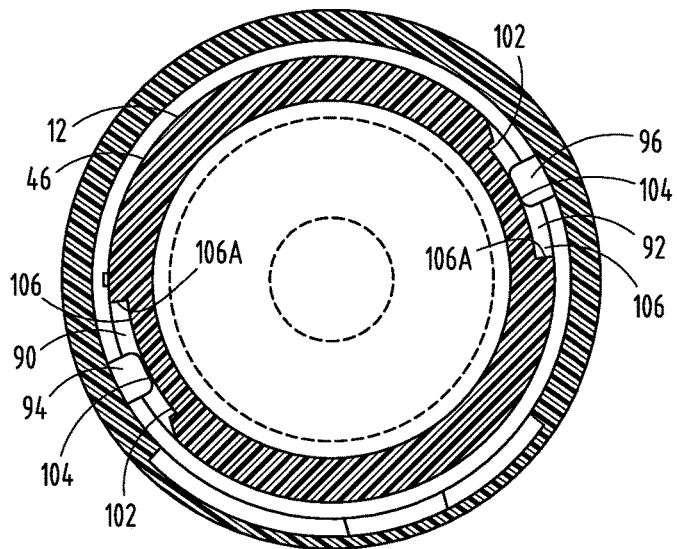
FIG. 21E is a cross-sectional view of the filter head assembly of FIG. 21C taken at XXIE-XXIE.

Referring now to FIGS. 21A-21C, linear movement of the filter unit 12 into the filter head assembly 20 generally occurs until the laterally extending key member 22 begins to transition from the first segment 85 into the second segment 87 of the key slot 24. At the same time, the first and second guides 94, 96 are transitioning from the first segment 102 of the first and second engagement surfaces 90, 92, respectively, into the second segment 104 of the first and second engagement surfaces 90, 92, respectively. As the laterally extending key member 22 transitions into the second segment 87 and the first and second guide members 94, 96 transition into the second segment 104 of the first and second engagement surfaces 90, 92, the filter unit 12 begins to rotate clockwise into the filter head assembly 20. Because the second segment 87 of the key slot 24 is at an angle relative to the longitudinal extent of the filter head assembly 20, and also because the second segment 104 of the first and second engagement surfaces 90, 92 is at the same general angle as the second segment 87 of the key slot 24, the filter unit 12 begins to draw into the filter head assembly 20, as shown in FIGS. 21B and 21C. At the same time, the engagement protrusion 26 has engaged and is partially inserted into the filter head sleeve 156. Because the filter unit 12 is rotating into the filter head assembly 20, the engagement protrusion 26 subsequently rotates the filter head sleeve 156 and the filter receiver 150 as the filter unit 12 is drawn into the filter head assembly 20 (FIGS. 21D and 21E).

Figure 21F:
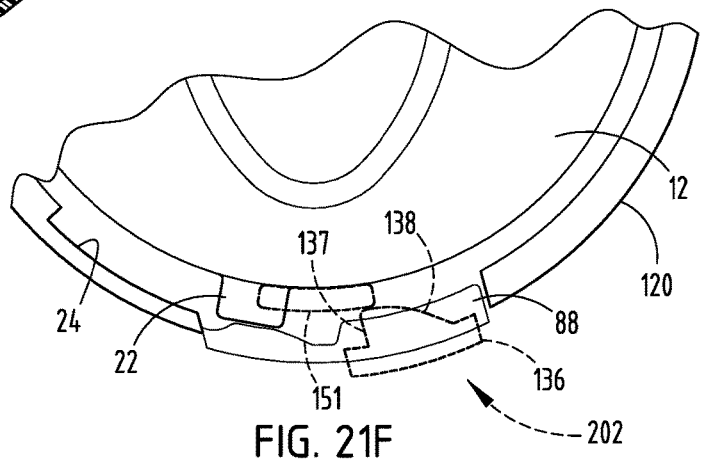
FIG. 21F is a partial cross-sectional view of the filter head assembly of FIG. 21C taken at XXIF-XXIF.

As shown in FIGS. 21A, 21B, and 21F, as the laterally extending key member 22 passes through the second segment 87 of the key slot 24, the laterally extending key member 22 passes by the interference member 88. As the laterally extending key member 22 passes by the interference member 88, the laterally extending key member 22 abuts the interference member 88 and forces the interference member 88 outward, thereby moving the abutment wall 137 on the abutment catch 136 from the interference position 200 to a non-interference position 202. When the interference member 88, and consequently the abutment wall 137 on the abutment catch 136, is moved to the non-interference position 202, the stop member 151 disposed on the filter receiver 150 is free to rotate past the interference member 88, and consequently the abutment catch 136. Absent the laterally extending key member 22, which abuts the interference member 88 and forces it outward, the abutment wall 137 on the abutment catch 136 would remain in the interference position 200, thereby preventing the stop member 151 on the filter receiver 150 from rotating past the interference member 88. Consequently, the filter unit 12 would be unable to move from the bypass position 154 (FIGS. 20A-20G) to the filtering position 152 (FIGS. 22A-22G).

Referring now to FIGS. 22A-22D, after the stop member 151 has cleared the abutment catch 136 on the interference member 88, the laterally extending key member 22 moves past the interference member 88 and begins to transition into the third segment 91 of the key slot 24. At the same time, the first and second guides 94, 96 transition into the third segment 106 of the first and second engagement surfaces 90, 92. As the laterally extending key member 22 engages a stop wall 204 in the key slot 24, the first and second guides 94, 96 engage the abutment wall 106A (FIGS. 22E and 22F) in the third segment 106 of the first and second engagement surfaces 90, 92. The retention nub 91A assists in securing the laterally extending key member 22 against the stop wall 204 of the key slot 24.

As shown in FIGS. 23-26, the filter unit 12 is now fully inserted into the filter head assembly 20 and the bypass channel 157 has been fully rotated out of alignment with the inlet extension member 126 and the outlet extension member 128. Consequently, water that flows into the filtering pathway 155 flows into the filter unit 12 through the inlet 70 through the sidewall 61 and into the water filter 39. The water then passes through the filtering media 41 and into a central column of the filter unit 12, where the water flows past the outlet 44 of the water filter 39 into the outlet 72 of the filter unit 12. The filtered water then passes into the filtered water pathway 155 of the filter receiver 150 and exits out the outlet extension member 128 to a water line. The water line then relays the filtered water to a dispenser, where it is available for consumption by a user.

When the filter unit 12 is to be replaced, the filter unit 12 is rotated counterclockwise and the reverse steps disclosed above are conducted. Notably, the laterally extending key member 22 does not move the interference member 88 out of the interference position 200 for the stop member 151 during removal. This step is unnecessary as the stop member 151 engages the sloped wall 138 of the abutment catch 136. Consequently, as a result of the sloped wall 138 construction, the stop member 151 is able to force the interference member 88 to the non-interference position 202 without the assistance of the laterally extending key member 22. The filter unit 12 is then rotated counterclockwise until the filter unit 12 can be withdrawn in a linear motion from the filter head assembly 20.

In the illustrated embodiment, the water filter system 10 is adapted to receive a filter unit 12, which is fully inserted by a quarter turn installation. It is contemplated that the lengths of the segments of the first and second engagement surfaces 90, 92, as well as the lengths of the first, second, and third segments 85, 87, and 91 of the key slot 24 may vary such that the turning radius may be greater than or less than one quarter turn of the filter unit 12 relative to the filter head assembly 20.

It will be understood by one having ordinary skill in the art that the water filter system 10, as described herein, can be used in a variety of appliances, such as refrigerators, dishwashers, and clothes washers and dryers. Further, it will be understood that the water filter system 10 can be used for a variety of applications, such as a second stage water filter for a dishwater, a water steam filter for an oven, and a water cleaning filter for consumption by a user out of a refrigerator. These are examples only and are not meant to be limiting.

The above description is considered that of the illustrated embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:
1. A filter unit comprising:
a filter member;
a body portion;
an engagement protrusion extending from the body portion and comprising a containment seal, wherein at least one cross section of the engagement protrusion at a location of the containment seal, taken perpendicular to a central longitudinal axis of the body portion, includes an outer perimeter having a single axis of symmetry, and wherein the containment seal acts as a barrier that prevents filtered water from leaking around the body portion during use, the engagement protrusion being in an offset position on the body portion with respect to the central longitudinal axis;
at least one engagement surface traversing around at least part of the body portion, the at least one engagement surface having a linear movement section for linear movement of the body portion, wherein the linear movement section transitions to a rotational movement section for rotational movement of the body portion, wherein the rotational movement section is angled from the linear movement section; and
a water inlet path and a water outlet path extending through a portion of the engagement protrusion defined by the at least one cross section.
2. The filter unit of claim 1, wherein the engagement protrusion is configured to engage a filter head sleeve of a filter head assembly, wherein at least one cross section of the filter head sleeve taken perpendicular to a rotational axis of the filter head sleeve, includes an egg-shaped inner perimeter having only one axis of symmetry.
3. The filter unit of claim 1, further comprising:
a cross-contamination seal configured to keep incoming unfiltered water entering the water inlet path from cross-contaminating with filtered water leaving the water outlet path.
4. The filter unit of claim 3, wherein the containment seal and the cross-contamination seal are spaced apart.
5. The filter unit of claim 1, wherein the rotational movement section of the at least one engagement surface extends along a plane that is substantially perpendicular to the linear movement section of the at least one engagement surface.

6. The filter unit of claim 5, wherein the at least one engagement surface further comprises a transition section between the linear movement section and the rotational movement section.

7. The filter unit of claim 6, wherein the transition section is positioned at an angle with respect to the linear movement section and the rotational movement section.

8. The filter unit of claim 1, wherein the water outlet path at the at least one cross section is positioned in alignment with the central longitudinal axis of the body portion.

9. The filter unit of claim 1, wherein the water inlet path and the water outlet path at the at least one cross section are in alignment with the single axis of symmetry of the outer perimeter.

10. The filter unit of claim 1, wherein the filter member is a filter media.

* * * * *